US010923083B2

(12) United States Patent
Saito et al.

(10) Patent No.: US 10,923,083 B2
(45) Date of Patent: Feb. 16, 2021

(54) DISPLAY CONTROL DEVICE, DISPLAY CONTROL METHOD, AND PROGRAM

(71) Applicant: Sony Corporation, Tokyo (JP)

(72) Inventors: Mari Saito, Kanagawa (JP); Masakazu Yajima, Kanagawa (JP); Yoshiyasu Kubota, Kanagawa (JP); Chisako Kajihara, Tokyo (JP); Akihiro Mukai, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/463,009

(22) PCT Filed: Oct. 4, 2017

(86) PCT No.: PCT/JP2017/036186
§ 371 (c)(1),
(2) Date: May 22, 2019

(87) PCT Pub. No.: WO2018/100874
PCT Pub. Date: Jun. 7, 2018

(65) Prior Publication Data
US 2020/0090627 A1 Mar. 19, 2020

(30) Foreign Application Priority Data

Nov. 29, 2016 (JP) .............................. JP2016-231232

(51) Int. Cl.
G09G 5/377 (2006.01)
G06T 19/00 (2011.01)
(Continued)

(52) U.S. Cl.
CPC ............ G09G 5/377 (2013.01); A01K 11/006 (2013.01); A01K 29/005 (2013.01); G06T 11/00 (2013.01);
(Continued)

(58) Field of Classification Search
None
See application file for complete search history.

(56) References Cited

U.S. PATENT DOCUMENTS 9,589,372 B1 * 3/2017 Bean .................. G06K 9/00744
2012/0001938 A1 * 1/2012 Sandberg ................ H04L 67/38
345/633

(Continued)

FOREIGN PATENT DOCUMENTS

JP 2013-037476 2/2013
JP 2013037476 A * 2/2013

(Continued)

OTHER PUBLICATIONS

International Search Report and English translation thereof dated Jan. 9, 2018 in connection with International Application No. PCT/JP2017/036186.

Primary Examiner — David H Chu
(74) Attorney, Agent, or Firm — Wolf, Greenfield & Sacks, P.C.

(57) ABSTRACT

[Object] It is desirable to provide a technology of enabling a user to easily comprehend one target object whose AR information is presented to the user.
[Solution] Provided is a display control device, including: a display control unit configured to control display of information related to a target object located in a field of view of a user, in which, in a case in which it is determined that at least a part of the target object is shielded by another object on the basis of a position of the user, the display control unit controls display of an image related to the target object such that the target object shielded in the field of view is displayed in a form different from a form visually recognized by the user.

19 Claims, 23 Drawing Sheets

(51) Int. Cl.
     *A01K 11/00*     (2006.01)
     *A01K 29/00*     (2006.01)
     *G06T 11/00*     (2006.01)
     *G09G 5/38*      (2006.01)

(52) U.S. Cl.
     CPC ............ *G06T 19/006* (2013.01); *G09G 5/38* (2013.01); *G09G 2320/0261* (2013.01); *G09G 2340/12* (2013.01); *G09G 2354/00* (2013.01)

(56) References Cited

U.S. PATENT DOCUMENTS

| | | | | |
|---|---|---|---|---|
| 2013/0009993 | A1* | 1/2013 | Horseman | G06F 19/3418 345/633 |
| 2014/0063064 | A1* | 3/2014 | Seo | G01C 21/365 345/633 |
| 2017/0124764 | A1* | 5/2017 | Akselrod | G06T 19/20 |

FOREIGN PATENT DOCUMENTS

| | | |
|---|---|---|
| JP | 2013-134610 | 7/2013 |
| JP | 2014-106681 | 6/2014 |
| JP | 2015-173605 | 10/2015 |

\* cited by examiner

FIG. 5
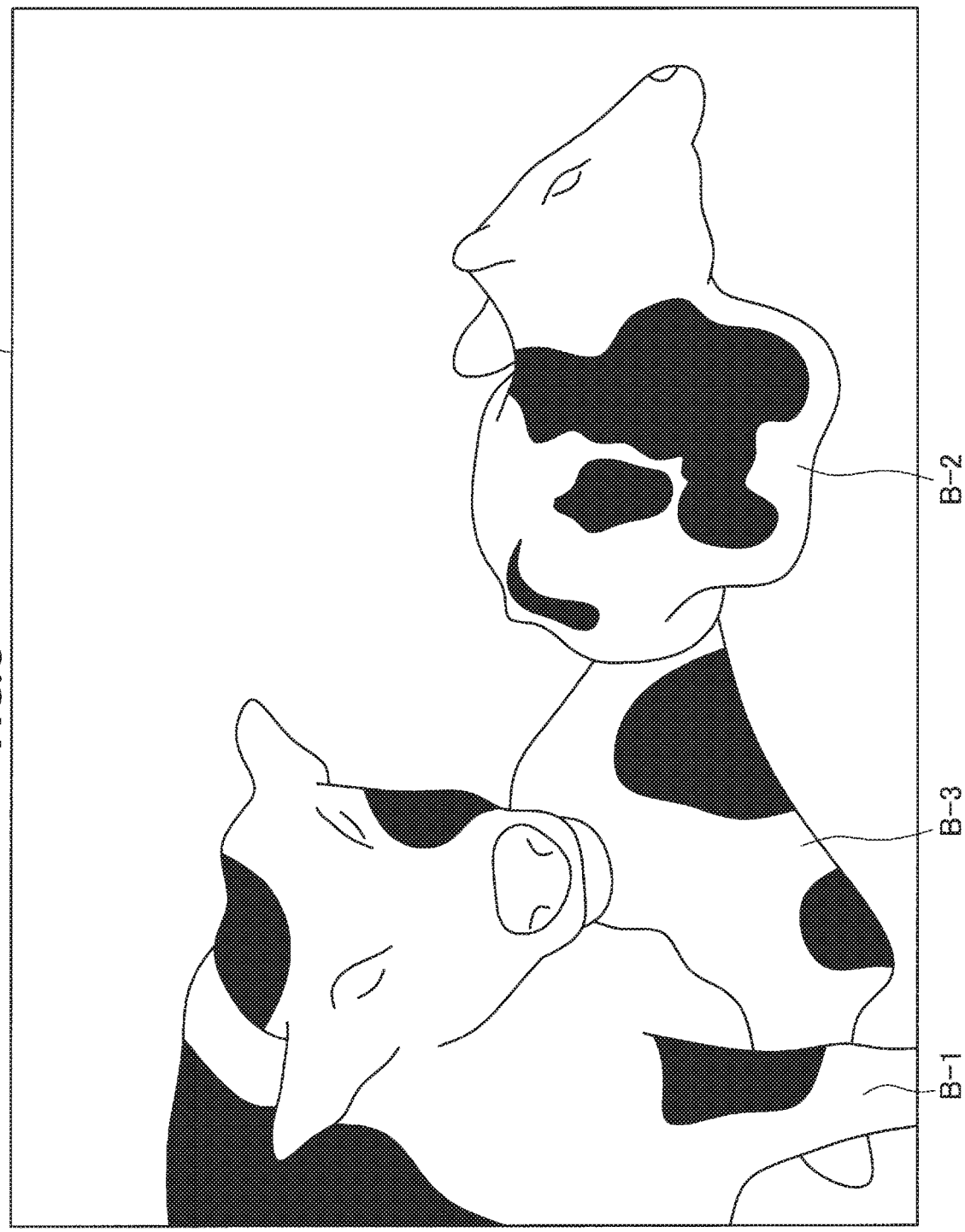
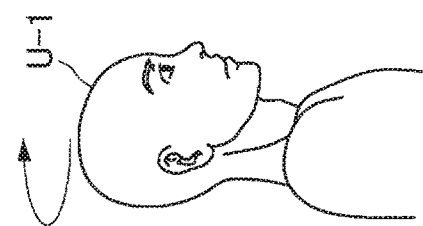

FIG. 7
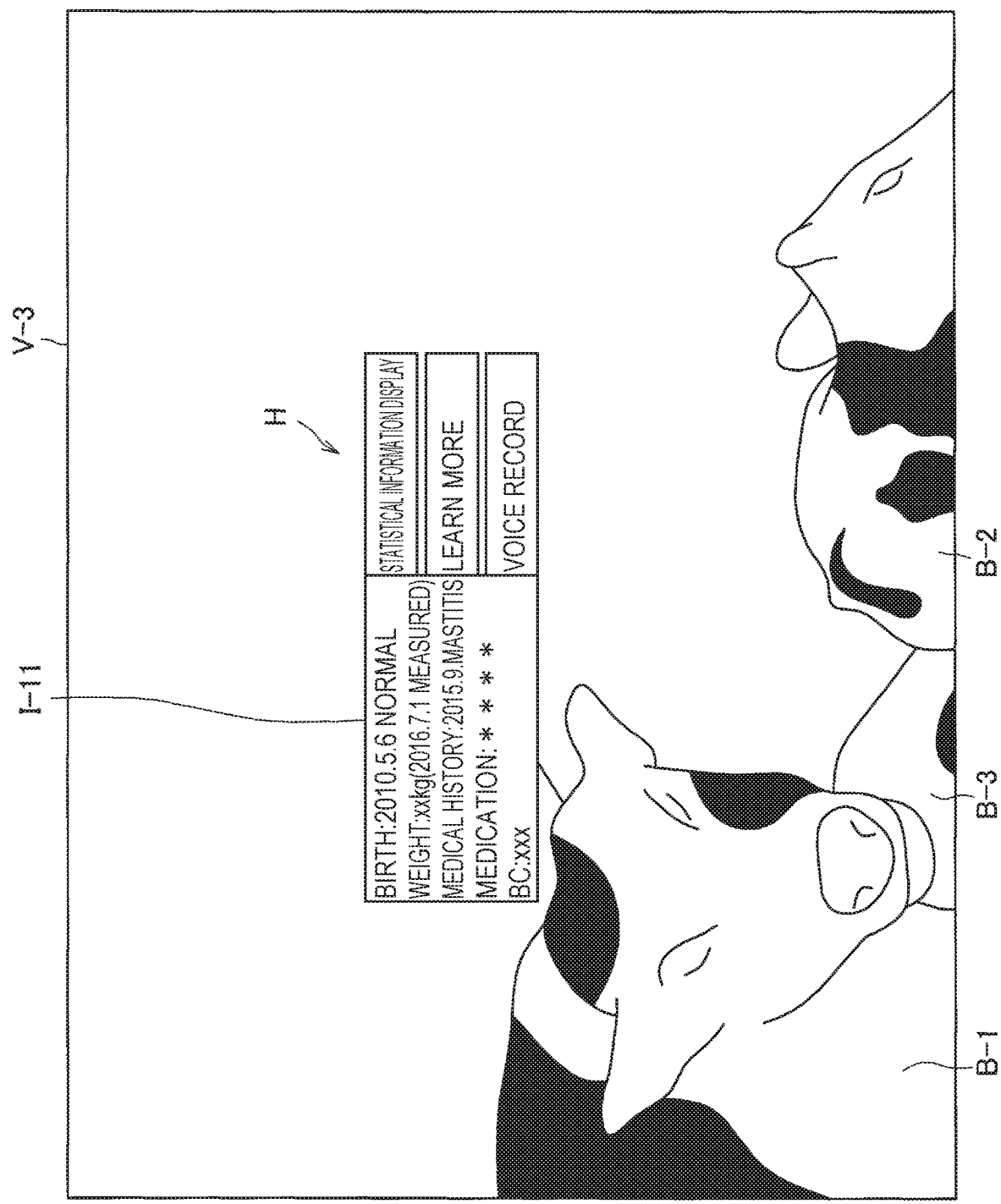

FIG. 8
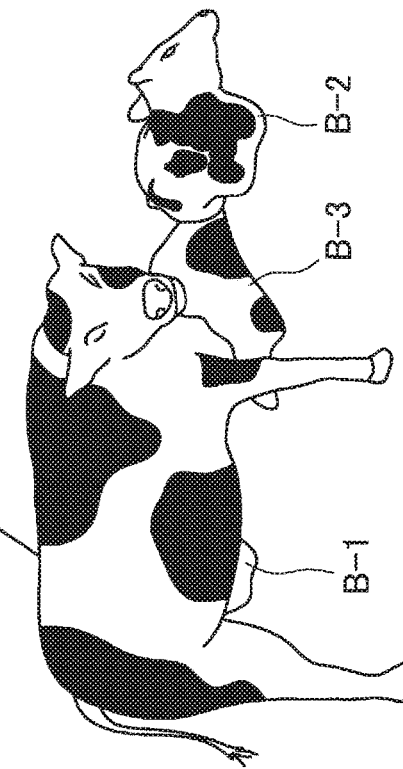
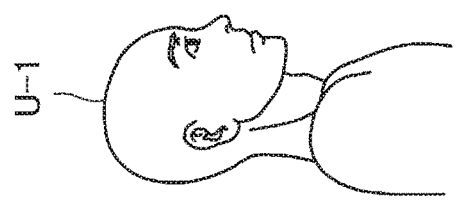

FIG. 10
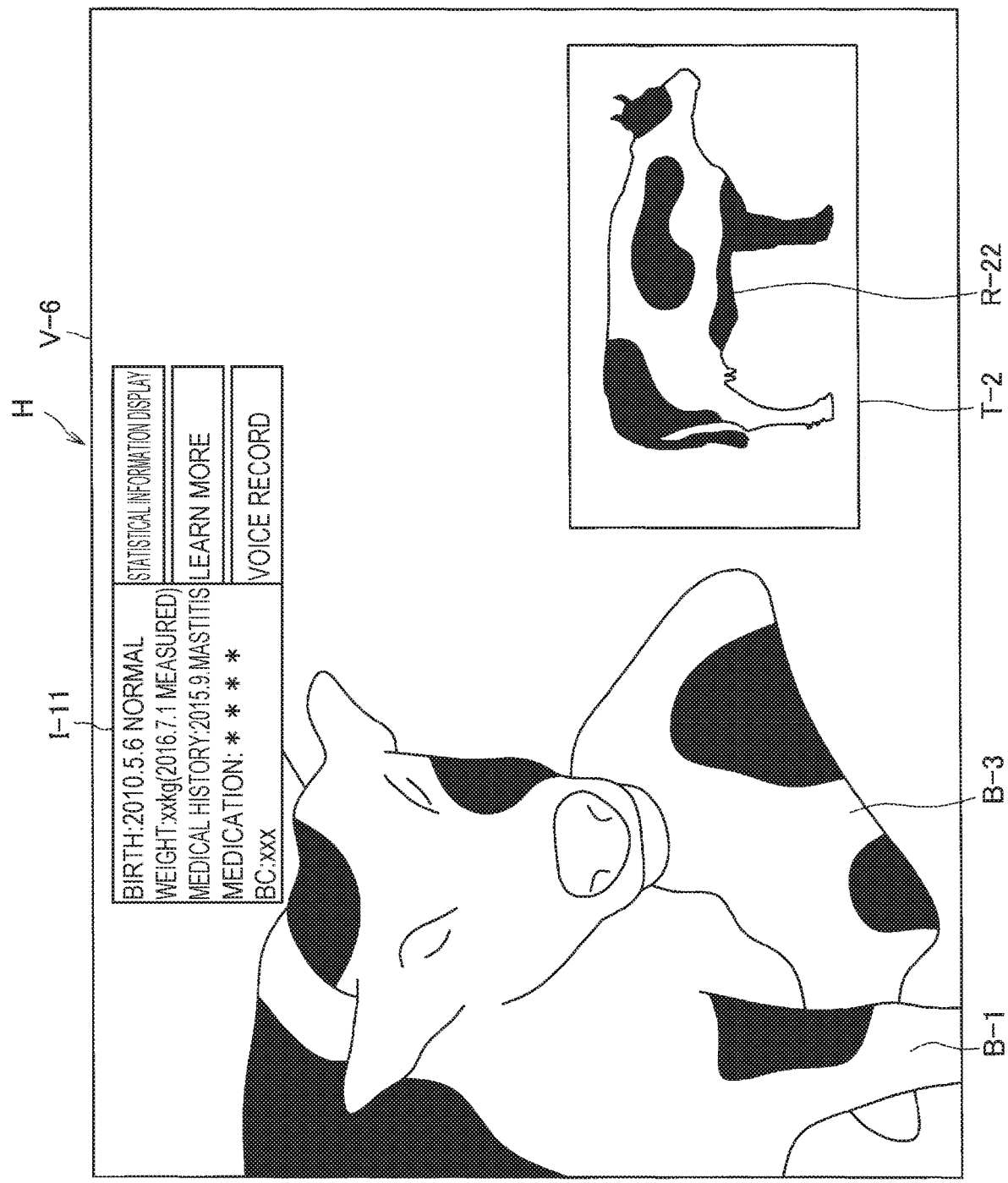
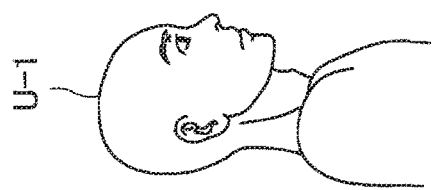

FIG. 11
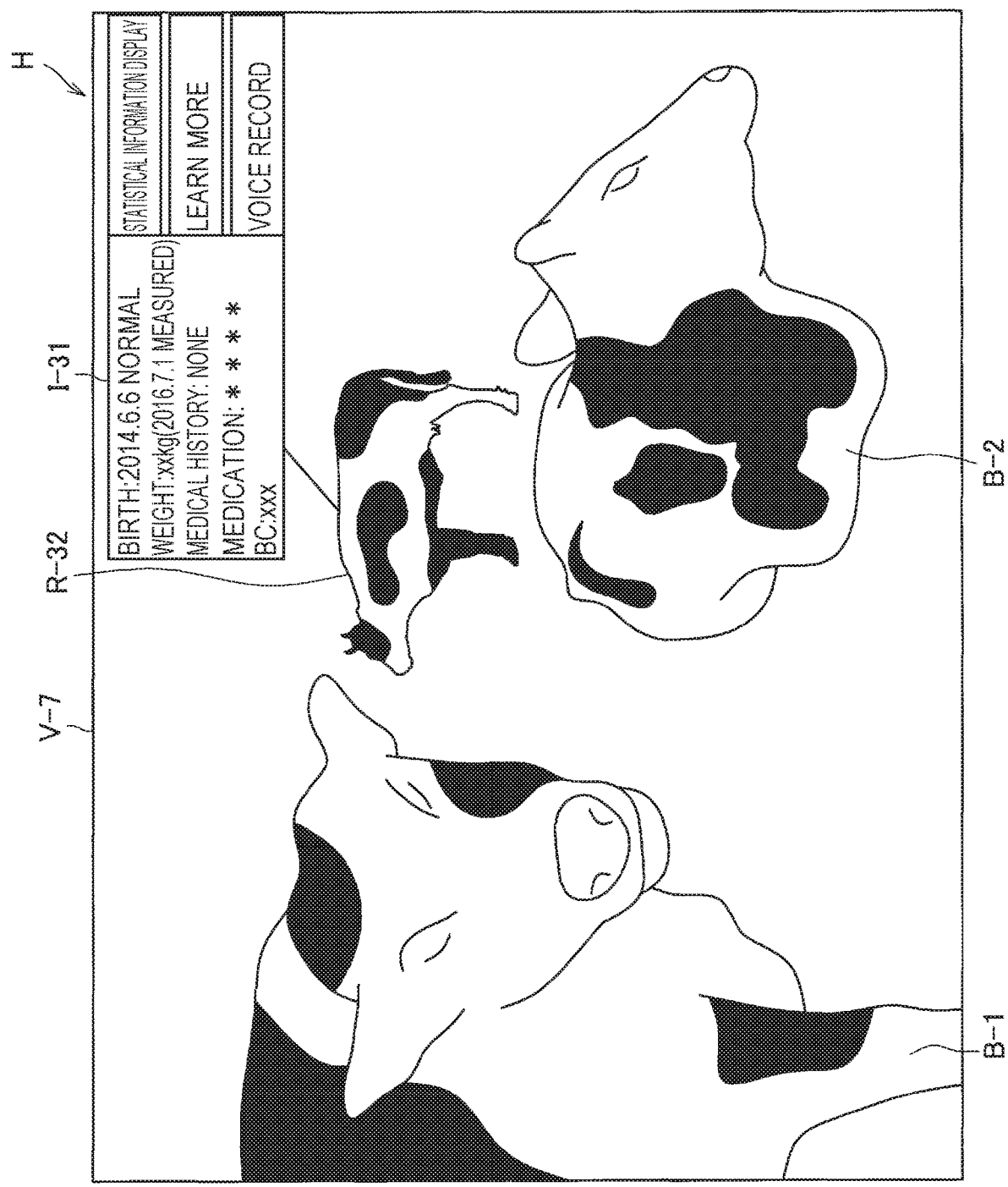
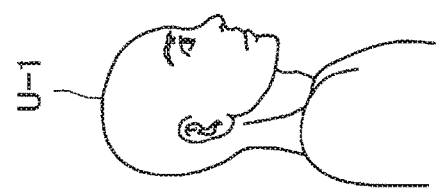

FIG. 12
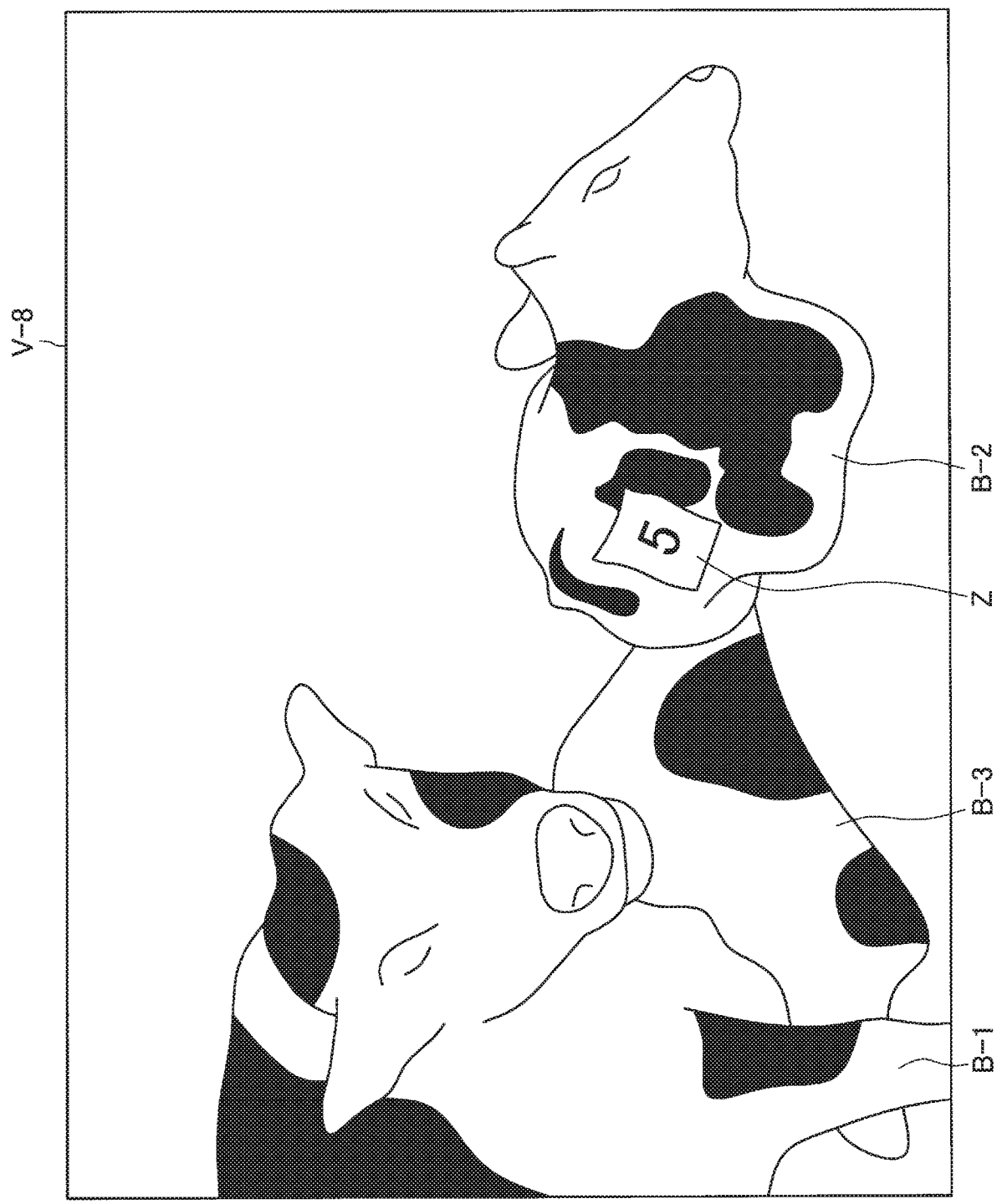

FIG. 13
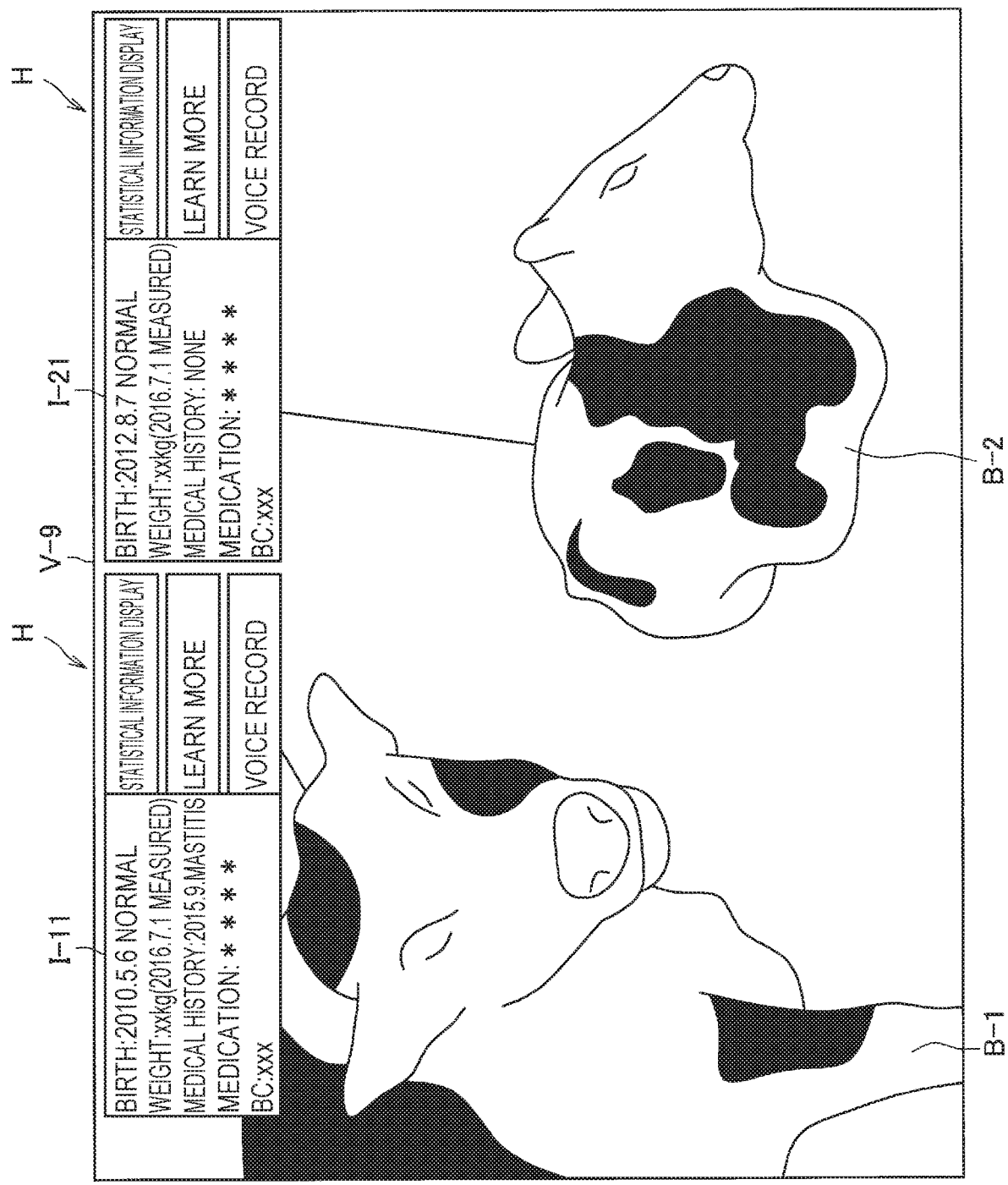

FIG. 15
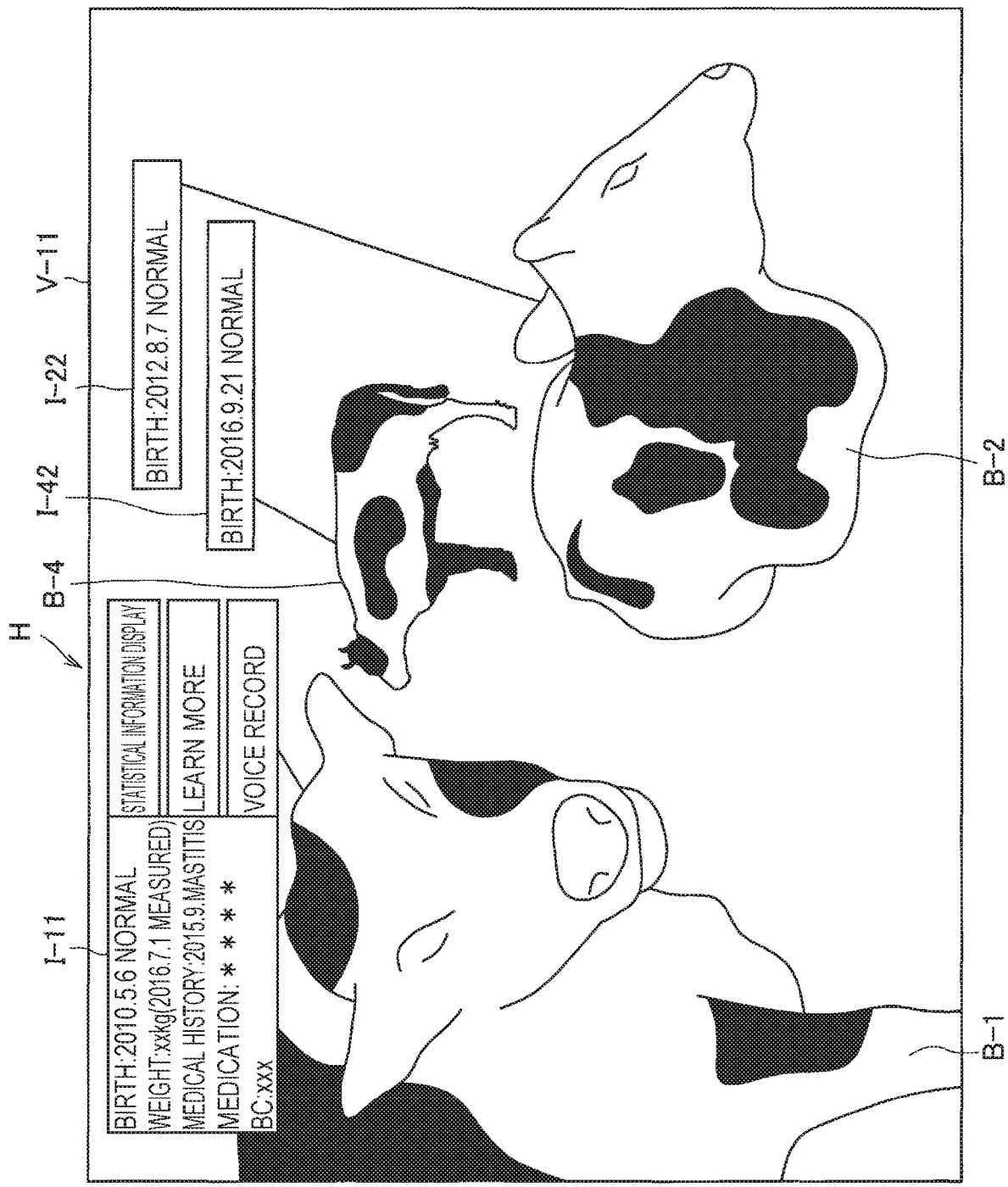
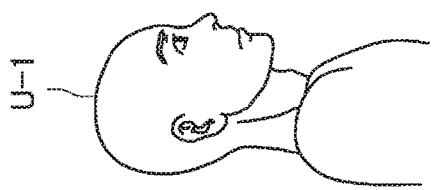

DISPLAY CONTROL DEVICE, DISPLAY CONTROL METHOD, AND PROGRAM

CROSS-REFERENCE TO RELATED APPLICATIONS

The present application claims the benefit under 35 U.S.C. § 371 as a U.S. National Stage Entry of International Application No. PCT/JP2017/036186, filed in the Japanese Patent Office as a Receiving office on Oct. 4, 2017, which claims priority to Japanese Patent Application Number JP2016-231232, filed in the Japanese Patent Office on Nov. 29, 2016, each of which is hereby incorporated by reference in its entirety.

TECHNICAL FIELD

The present disclosure relates to a display control device, a display control method, and a program.

BACKGROUND ART

In recent years, an augmented reality (AR) technology has become known as a technology for expressing the real world in an augmented state. For example, as an example of the AR technology, a technique for informing a user that there is one target object in a case in which the one target object located in the field of view of the user is shielded by another object is disclosed (for example, see Patent Literature 1). Further, as an example of the AR technology, a technique of recognizing one target object located in a field of view of a user and presenting information related to the one target object (hereinafter also referred to as "AR information") to the user is known.

CITATION LIST

Patent Literature

Patent Literature 1: JP 2014-106681A

DISCLOSURE OF INVENTION

Technical Problem

However, there are cases in which it is hard for the user to see one target object whose AR information is presented to the user. In this case, a situation in which it is difficult for the user to comprehend the target object whose AR information is presented to the user can occur. In this regard, it is desirable to provide a technology of enabling a user to easily comprehend one target object whose AR information is presented to the user.

Solution to Problem

According to the present disclosure, there is provided a display control device, including: a display control unit configured to control display of information related to a target object located in a field of view of a user. In a case in which it is determined that at least a part of the target object is shielded by another object on the basis of a position of the user, the display control unit controls display of an image related to the target object such that the target object shielded in the field of view is displayed in a form different from a form visually recognized by the user.

According to the present disclosure, there is provided a display control method, including: controlling display of information related to a target object located in a field of view of a user; and controlling, by a processor, in a case in which it is determined that at least a part of the target object is shielded by another object on the basis of a position of the user, display of an image related to the target object such that the target object shielded in the field of view is displayed in a form different from a form visually recognized by the user.

According to the present disclosure, there is provided a program causing a computer to function as a display control device including: a display control unit configured to control display of information related to a target object located in a field of view of a user. In a case in which it is determined that at least a part of the target object is shielded by another object on the basis of a position of the user, the display control unit controls display of an image related to the target object such that the target object shielded in the field of view is displayed in a form different from a form visually recognized by the user.

Advantageous Effects of Invention

As described above, according to the present disclosure, a technology of enabling a user to easily comprehend one target object whose AR information is presented to the user is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram for describing another example of farm animal selection.

FIG. 7 is a diagram for describing an AR display example of the individual information of a farm animal and a second determination example in a case in which other farm animals are hard to see.

FIG. 8 is a diagram for describing an AR display example of the individual information of a farm animal and a determination example in a case in which other farm animals are hard to see.

FIG. 10 is a diagram illustrating a display example of an image obtained by photographing a farm animal from a side.

FIG. 11 is a diagram illustrating an AR display example of the individual information of a farm animal selected by a selecting unit.

FIG. 12 is a diagram illustrating a display example of an ID assigned by a user.

FIG. 13 is a diagram illustrating an example in which individual information of each of a plurality of farm animals is simultaneously AR-displayed.

FIG. 15 is a diagram illustrating an example of reducing an information amount of the individual information of each of a plurality of farm animals.

MODE(S) FOR CARRYING OUT THE INVENTION

Figure 1:
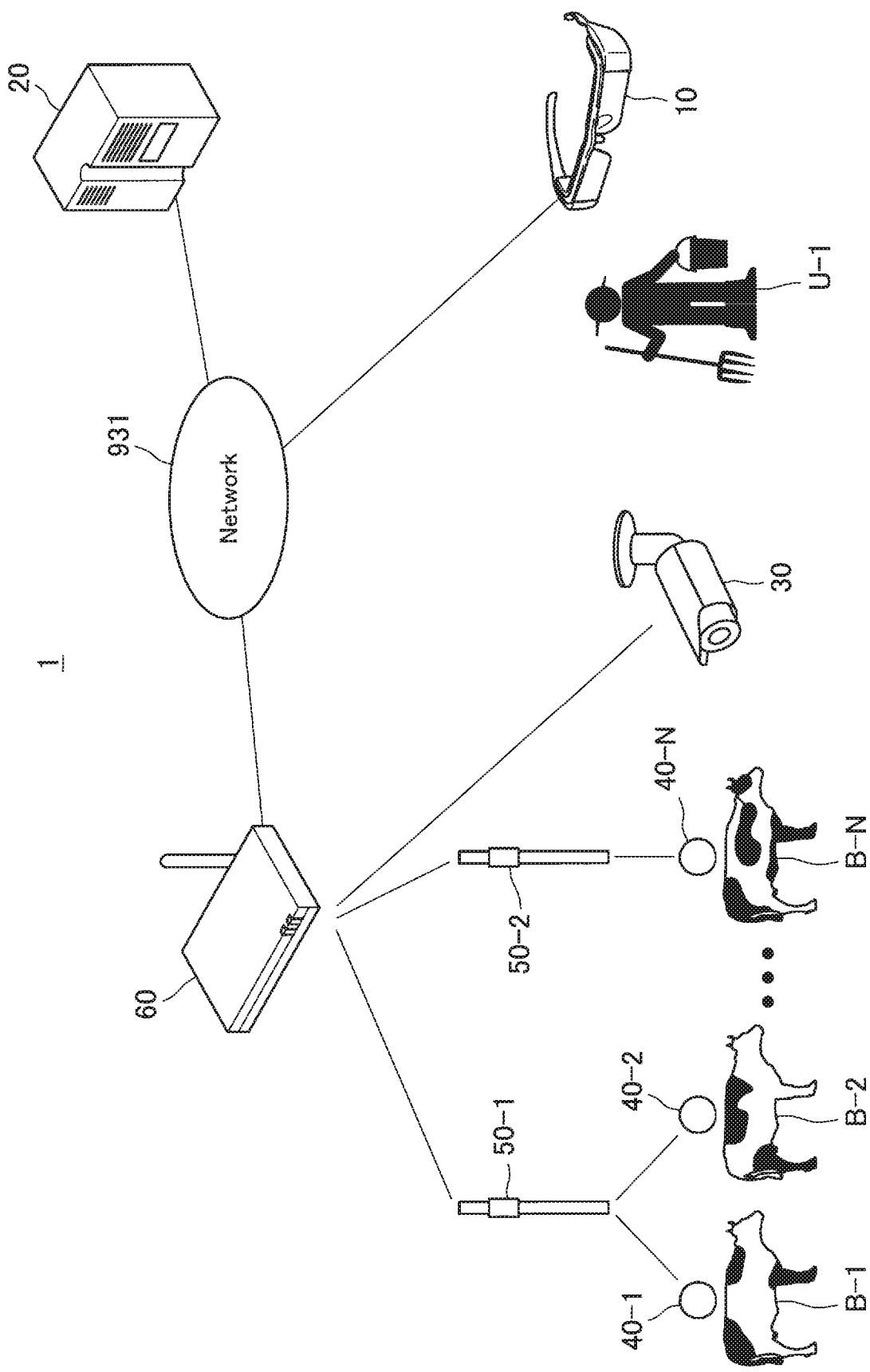
FIG. 1 is a diagram illustrating a configuration example of a display control system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in the present specification and the drawings, structural elements that have substantially the same or similar function and structure are sometimes distinguished from each other using different numbers after the same reference sign. However, when there is no need in particular to distinguish structural elements that have substantially the same or similar function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

Further, the description will proceed in the following order.

0. Background
1. Embodiment of the present disclosure
1.1. System configuration example
1.2. Functional configuration example of display control device
1.3. Functional configuration example of server
1.3. Details of functions of display control system
1.3.1. Selection of farm animal
1.3.2. AR display of individual information
1.3.3. VR display of image
1.3.4. Display of identification information
1.3.5. AR display of plurality of pieces of individual information
1.3.6. Operation examples
1.4. Various modified examples
1.5. Hardware configuration example
2. Conclusion

0. BACKGROUND

In recent years, an AR technology has become known as a technology for expressing the real world in an augmented state. For example, as an example of the AR technology, a technique for informing a user that there is one target object in a case in which the one target object located in the field of view of the user is shielded by another object is disclosed (for example, see JP 2014-106681A). Further, as an example of the AR technology, a technique of recognizing one target object located in a field of view of a user and presenting information related to the one target object (AR information) to the user is known.

However, there are cases in which it is hard for the user to see one target object whose AR information is presented to the user. As an example of this case, there is a case in which one target object whose AR information is presented to the user is shielded by another object. Further, as another example of this case, there is a case in which one target object whose AR information is presented to the user is far from the user. However, cases in which it is difficult for the user to see one target object whose AR information is presented to the user are not limited to these examples.

As described above, in a case in which it is difficult for the user to see one target object whose AR information is presented to the user, a situation in which it is difficult to the user to comprehend the one target object whose AR information is presented to the user may occur. In this regard, in this specification, a technology of enabling the user to easily comprehend one target object whose AR information is presented to the user will be mainly described.

Further, in the following description, a case in which one target object whose AR information is presented to the user (or a plurality of target objects) is a farm animal is mainly assumed. However, the one target object (or a plurality of target objects) whose AR information is presented to the user may not be a farm animal. For example, the one target object (or the plurality of target objects) whose AR information is presented to the user may be a living object (such as an athlete as will be described later) or a non-living object (for example, a mobile object such as a vehicle). Further, in this specification, a case in which there is a farm animal in an outdoor farm is mainly assumed, but the farm animal may be in an indoor farm.

Further, in the following description, a case in which another object shielding the one target object (or the plurality of target objects) whose AR information is presented to the user is also a farm animal is mainly assumed. However, the other object shielding the one target object (or the plurality of target objects) whose AR information is presented to the user may not be a farm animal. For example, the other object shielding the one target object (or the plurality of target objects) whose AR information is presented to the user may be an object other than a farm animal (for example, a building, stacked hay, or the like).

Further, in the following description, an augmentation expression of the real world is also referred to simply as "AR display." More specifically, the AR display may refer to display for a position depending on a target object located in the field of view of the user. On the other hand, in the following description, a virtual expression (a virtual reality (VR) expression) different from the augmentation of the real world is also referred to simply as "VR display." More specifically, the VR display may be display for a position not depending on a target object located in the field of view of the user.

Further, in the following description, individual information of one target object (or a plurality of target objects) to be AR displayed will be described as the AR information. However, the AR information is not limited to this example.

The background of an embodiment of the present disclosure has been described above.

1. EMBODIMENT OF THE PRESENT DISCLOSURE

[1.1. System Configuration Example]

Next, a configuration example of a display control system according to an embodiment of the present disclosure will be described with reference to the appended drawings. FIG. 1 is a diagram illustrating a configuration example of a display control system according to an embodiment of the present disclosure. As illustrated in FIG. 1, a display control system 1 includes a display control device 10, a server 20, an external sensor 30, wearable devices 40-1 to 40-N, repeaters 50-1 and 50-2, a gateway device 60, and a network 931.

In this specification, a case in which the network 931 is a wireless local area network (LAN) is mainly assumed, but as will be described later, a type of network 931 is not limited. Further, the repeater 50 (the repeaters 50-1 and 50-2) relays communication between the wearable device 40 (the wearable devices 40-1 to 40-N) and the server 20. In the example illustrated in FIG. 1, the number of repeaters 50 is two, but the number of repeaters 50 is not limited to two and is sufficiently two or more. The gateway device 60 connects the network 931 with the repeater 50 (the repeaters 50-1 and 50-2) and the external sensor 30.

The display control device 10 is a device used by a user U-1. In this specification, a case in which the user U-1 is a farmer breeding a farm animal B will be mainly assumed. However, the user U-1 is not limited to a farmer breeding a farm animal B. For example, the user U-1 may be a veterinarian who treats an injury or illness of a farm animal B.

Further, in this specification, in consideration of allowing the user U-1 to efficiently perform manual labor, a case in which the display control device 10 is a type of device that is worn by the user U-1 (for example, a glasses type) is assumed. However, the display control device 10 may be a type of device which is not worn by the user U-1 (for example, a smartphone or the like). Further, in this specification, a case in which the display control device 10 is a see-through type device is assumed. However, the display control device 10 may be a non-see-through type device.

The external sensor 30 is a sensor not directly attached to the body of a corresponding farm animal B (farm animals B-1 to B-N). In this specification, a case in which the external sensor 30 is a surveillance camera is mainly assumed, but the external sensor 30 is not limited to the surveillance camera. For example, the external sensor 30 may be a drone equipped with a camera. Further, in this specification, a case in which an image (hereinafter also referred to as an "overhead image") is obtained by capturing an overhead image of the farm animal B (the farm animals B-1 to B-N) by the external sensor 30 is mainly assumed. However, the direction of the external sensor 30 is not limited.

Further, in this specification, a case in which the external sensor 30 is a visible light camera is mainly assumed. However, a type of external sensor 30 is not limited. For example, the external sensor 30 may be an infrared camera or may be any other type of camera such as a depth sensor capable of acquiring three-dimensional data of a space. The image obtained by the external sensor 30 is transmitted from the external sensor 30 to the server 20 via the gateway device 60 and the network 931.

The server 20 is a device that performs various types of information processing for managing the farm animal B (the farm animals B-1 to B-N). Specifically, the server 20 stores information (hereinafter also referred to as "farm animal information") in which identification information, individual information, and position information of the farm animal B (the farm animals B-1 to B-N) are associated with one another. The identification information may include individual identification information assigned from a country, an identification number of an Internet of Things (IOT) device, an ID assigned by the user U-1, and the like. Further, the server 20 updates the farm animal information and reads the farm animal information if necessary. Further, in this specification, a case in which the farm animal information is stored in the server 20 is mainly assumed, but the farm animal information may be stored in a server different from the server 20.

The wearable device 40 (the wearable devices 40-1 to 40-N) is attached to the body of the corresponding farm animal B (the farm animals B-1 to B-N). The wearable device 40 transmits the identification number of the IOT device of the corresponding farm animal B and information specifying the position information to the server 20 via the repeater 50-1, the repeater 50-2, the gateway device 60, and the network 931. Here, various types of information are assumed as information specifying the position information of the farm animal B.

In the specification, the information specifying the position information of the farm animal B includes a reception strength of a wireless signal transmitted from each of the repeater 50-1 and the repeater 50-2 at predetermined time intervals in the wearable device 40. Then, the server 20 specifies the position information of the wearable device 40 (the farm animal B) on the basis of the reception strengths and the position information of each of the repeaters 50-1 and 50-2. Accordingly, in the server 20, it is possible to manage the position information of the farm animal B in real time.

Further, the information specifying the position information of the farm animal B is not limited to this example. For example, the information specifying the position information of the farm animal B may include an arrival period of time (a difference between a transmission time and a reception time) of a signal received from each Global Positioning System (GPS) satellite by the wearable device 40. Further, in this specification, a case in which the position information of the farm animal B is specified in the server 20 is mainly assumed, but the position information of the farm animal B may be specified in the wearable device 40. In this case, the position information of the farm animal B may be transmitted to the server 20 instead of the information specifying the position information of the farm animal B.

Alternatively, the information specifying the position information of the farm animal B may be an overhead image obtained by the external sensor 30. For example, if the server 20 manages a pattern of the farm animal B in advance for each individual, it is possible for the server 20 to specify a position of the pattern of the farm animal B recognized from the overhead image obtained by the external sensor 30 as the position information of the farm animal B.

The configuration example of the display control system 1 according to an embodiment of the present disclosure has been described above.

[1.2. Functional Configuration Example of Display Control Device]

Figure 2:
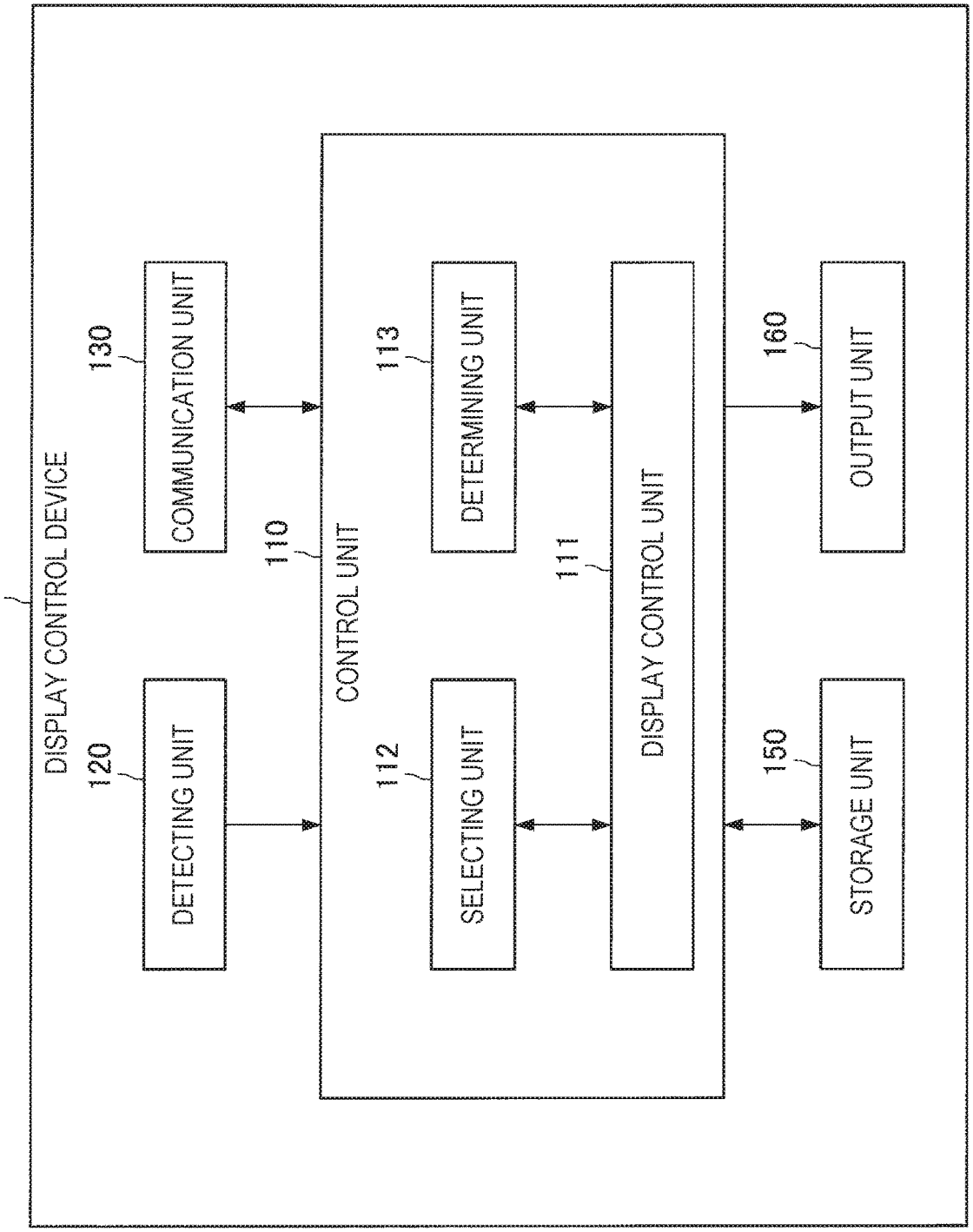
FIG. 2 is a block diagram illustrating a functional configuration example of a display control device according to the embodiment.

Next, a functional configuration example of the display control device 10 according to an embodiment of the present disclosure will be described. FIG. 2 is a block diagram illustrating a functional configuration example of the display control device 10 according to an embodiment of the present disclosure. As illustrated in FIG. 2, the display control device 10 includes a control unit 110, a detecting unit 120, a communication unit 130, a storage unit 150, and an output unit 160. The functional blocks of the display control device 10 will be described below.

The control unit 110 controls each unit of the display control device 10. Further, the control unit 110 may be constituted by a processing device such as one or more central processing units (CPUs). In a case in which the control unit 110 is constituted by a processing device such as a CPU, the processing device may be constituted by an electronic circuit. As illustrated in FIG. 2, the control unit 110 includes a display control unit 111, a selecting unit 112, and a determining unit 113. The blocks of the control unit 110 will be described later in detail.

The detecting unit 120 is a sensor capable of detecting an indication direction by the user U-1 (hereinafter also referred to simply as an "indication direction") in a three-dimensional space. In this specification, a case in which the line of sight of the user U-1 is used as the indication direction will be mainly described. Here, the line of sight of the user U-1 may be detected using any method. As an example, in a case in which the detecting unit 120 includes an imaging device, the line of sight of the user U-1 may be detected on the basis of an eye region shown in an image obtained by the imaging device. However, the indication direction is not limited to the line of sight of the user U-1.

For example, the indication direction may be detected on the basis of a detection result by a motion sensor detecting a motion of the user U-1 (an indication direction in which a position in a three-dimensional space detected by a motion sensor is a front may be detected). The motion sensor may detect an acceleration with the acceleration sensor or may detect an angular velocity with a gyro sensor (for example, a ring type gyroscope or the like). Alternatively, the indication direction may be detected on the basis of a detection result by a tactile device. An example of the tactile device is a pen type tactile device.

Alternatively, the indication direction may be a direction indicated by a predetermined object (for example, a direction in which a leading end of a stick points) or may be a direction indicated by a finger of the user U-1. In a case in which the detecting unit 120 includes an imaging device, the direction in which the predetermined object points and the direction indicated by the finger of the user U-1 may be detected on the basis of an object and a finger shown in an image obtained by the imaging device. Alternatively, the indication direction may be detected on the basis of a face recognition result of the user U-1. For example, in a case in which the detecting unit 120 has an imaging device, a center position between the eyes may be recognized on the basis of an image obtained by the imaging device, and a straight line extending from the center position between the eyes may be detected as the indication direction.

Alternatively, the indication direction may be a direction corresponding to speech content of the user U-1. In a case in which the detecting unit 120 includes a microphone, the direction corresponding to the speech content of the user U-1 may be detected on the basis of a voice recognition result for sound information obtained by a microphone. For example, in a case in which the user U-1 desires to designate an inner side of the field of view as the front in the indication direction, it is sufficient to produce speech indicating the inner side of the field of view (for example, "speech" such as "the farm animal on the inner side"). Accordingly, text data "inner side" is obtained as the voice recognition result for such speech, and the indication direction in which the inner side of the field of view is the front can be detected on the basis of the text data "inner side." Further, the speech content may be "show an overhead image," "show it from above," "show the farm animal on the inner side," or the like.

Further, the detecting unit 120 can detect various types of manipulations by the user U-1. Further, in this specification, a selection manipulation and a switching manipulation are mainly described as examples of the manipulation by the user U-1. Here, various types of manipulations by the user U-1 may be detected using any method. As an example, various types of manipulations by the user U-1 may be detected on the basis of a motion of the user U-1.

The detection of the motion of the user U-1 may be performed using any method. For example, in a case in which the detecting unit 120 includes an imaging device, the motion of the user U-1 may be detected from an image obtained by the imaging device. The motion of the user U-1 may be a wink or the like. Alternatively, the detecting unit 120 may detect the motion of the user U-1 with a motion sensor. For the motion sensor, an acceleration may be detected by an acceleration sensor, or an angular velocity may be detected by a gyro sensor. Alternatively, the motion of the user U-1 may be detected on the basis of a voice recognition result.

Alternatively, various types of manipulations by the user U-1 may be detected on the basis of a position of the body of the user U-1 (for example, the position of the head) or may be detected on the basis of a posture of the user U-1 (for example, a posture of the whole body or the like). Alternatively, various types of manipulations by the user U-1 may be detected on the basis of myoelectricity (for example, myoelectricity of a jaw, myoelectricity of an arm, or the like) or may be detected on the basis of an electroencephalogram. Alternatively, various types of manipulations by the user U-1 may be manipulations on a switch, a lever, a button, and the like.

Further, the detecting unit 120 can detect the direction of the display control device 10 and the position information of the display control device 10. Here, the direction of the display control device 10 and the position information of the display control device 10 may be detected using any method. For example, the direction of the display control device 10 may be detected by an axis-of-earth sensor or may be detected by a motion sensor. Further, the position information of the display control device 10 may be detected on the basis of an arrival period of time (a difference between a transmission time and a reception time) of a signal received from each GPS satellite by the display control device 10.

The communication unit 130 includes a communication circuit and has a function of communicating with other devices via the network 931 (FIG. 1). For example, the communication unit 130 is constituted by a communication interface. For example, the communication unit 130 can communicate with the server 20 via the network 931 (FIG. 1).

The storage unit 150 includes a memory and is a recording device that stores a program to be executed by the control unit 110 and data necessary for executing the program. Further, the storage unit 150 temporarily stores data for calculation by the control unit 110. Further, the storage unit 150 may be a magnetic storage device, a semiconductor storage device, an optical storage device, or a magneto-optical storage device.

The output unit 160 is an output device that outputs various types of information. For example, the output unit 160 may include a display capable of performing visible display to the user U-1, or the display may be a liquid crystal display or may be an organic electro-luminescence (EL). In particular, in work sites for farm animals or the like, a hands-free manipulation is desirable because there are cases in which the hands are unable to be used for work for the farm animals or the like because they are being used for other work. In this regard, the display is desirably a device that can be worn on the head of the user U-1 (for example, a head mounted display (HMD)). In a case in which the output unit 160 includes a housing which can be worn on the head of the user, the housing may include a display that performs the AR display and the VR display. At this time, the display may be a transmissive display or a non-transmissive display. In a case in which the display is a non-transmissive display, an image captured by an imaging device included in a sensor unit 120 is displayed, and thus the user U-1 can visually recognize a space corresponding to the field of view. Further, the output unit 160 may include an audio output device such as a speaker. Alternatively, the output unit 160 may include a tactile sense presenting device that presents a tactile sense to the user U-1 (the tactile presenting device includes an oscillator that vibrates in accordance with a predetermined voltage).

The functional configuration example of the display control device 10 according to an embodiment of the present disclosure has been described above.

[1.3. Functional Configuration Example of Server]

Figure 3:
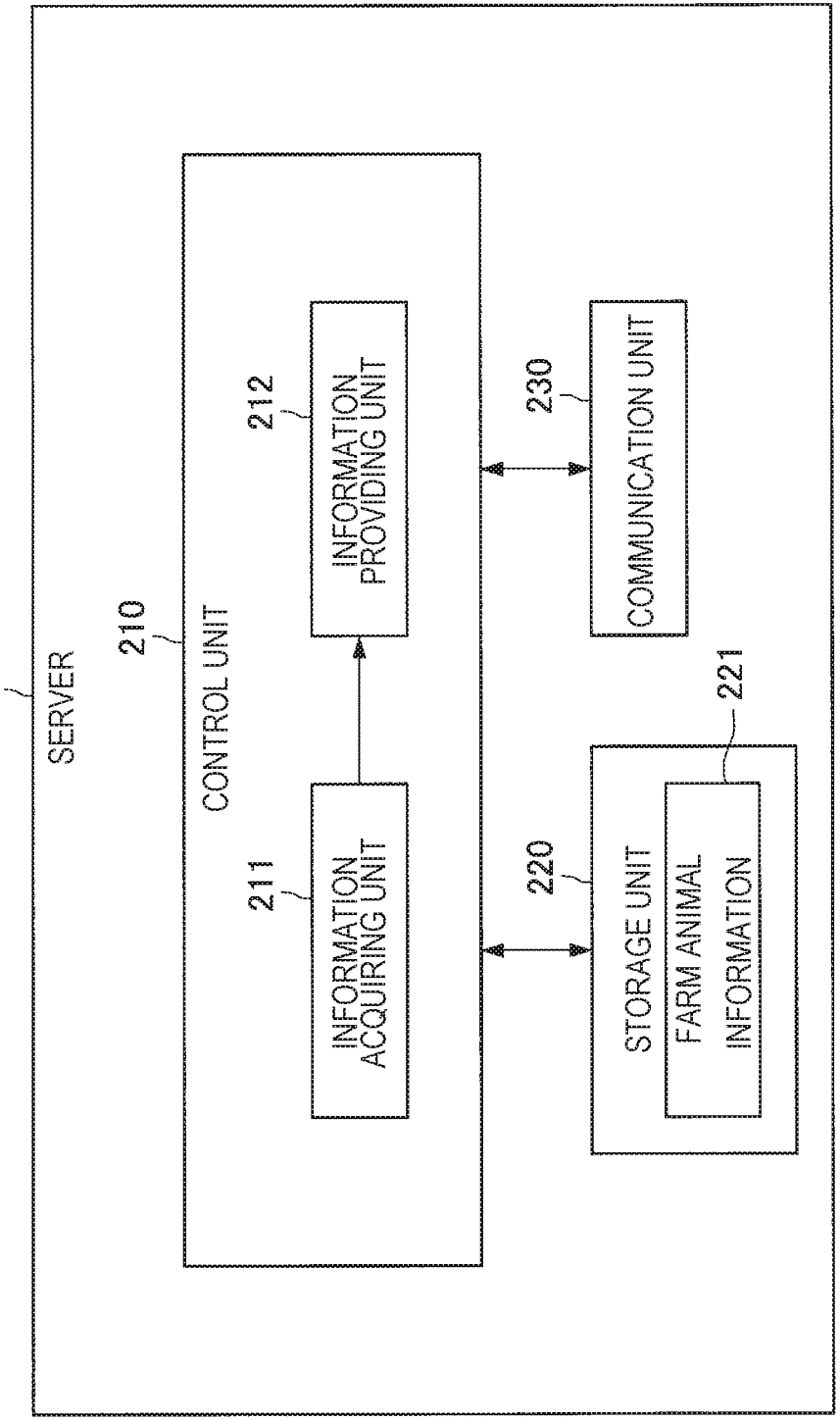
FIG. 3 is a block diagram illustrating a functional configuration example of a server according to the embodiment.

Next, a functional configuration example of the server 20 according to an embodiment of the present disclosure will be described. FIG. 3 is a block diagram illustrating a functional configuration example of the server 20 according to an embodiment of the present disclosure. As illustrated in FIG. 3, the server 20 includes a control unit 210, a storage unit 220, and a communication unit 230. The functional blocks of the server 20 will be described below.

The control unit 210 controls each unit of the server 20. Further, the control unit 210 may be constituted by a processing device such as, for example, a CPU. In a case in which the control unit 210 is constituted by a processing device such as a CPU, the processing device may be constituted by an electronic circuit. As illustrated in FIG. 3, the control unit 210 includes an information acquiring unit 211 and an information providing unit 212. The blocks of the control unit 210 will be described later in detail.

The storage unit 220 is a recording device that stores a program to be executed by the control unit 210 or stores data (for example, farm animal information 221 or the like) necessary for executing a program. Further, the storage unit 220 temporarily stores data for calculation by the control unit 210. Further, the storage unit 220 may be a magnetic storage unit device, a semiconductor storage device, an optical storage device, or a magneto-optical storage device.

The communication unit 230 has a function of communicating with other devices via the network 931 (FIG. 1). For example, the communication unit 230 includes a communication interface. For example, the communication unit 230 can communicate with the display control device 10, the external sensor 30 and the wearable device 40 (the wearable devices 40-1 to 40-N) via the network 931 (FIG. 1).

The functional configuration example of the server 20 according to an embodiment of the present disclosure has been described above.

[1.3. Details of Functions of Display Control System]

Next, the functions of the display control system 1 will be described in detail.

(1.3.1. Selection of Farm Animal)

Figure 4:
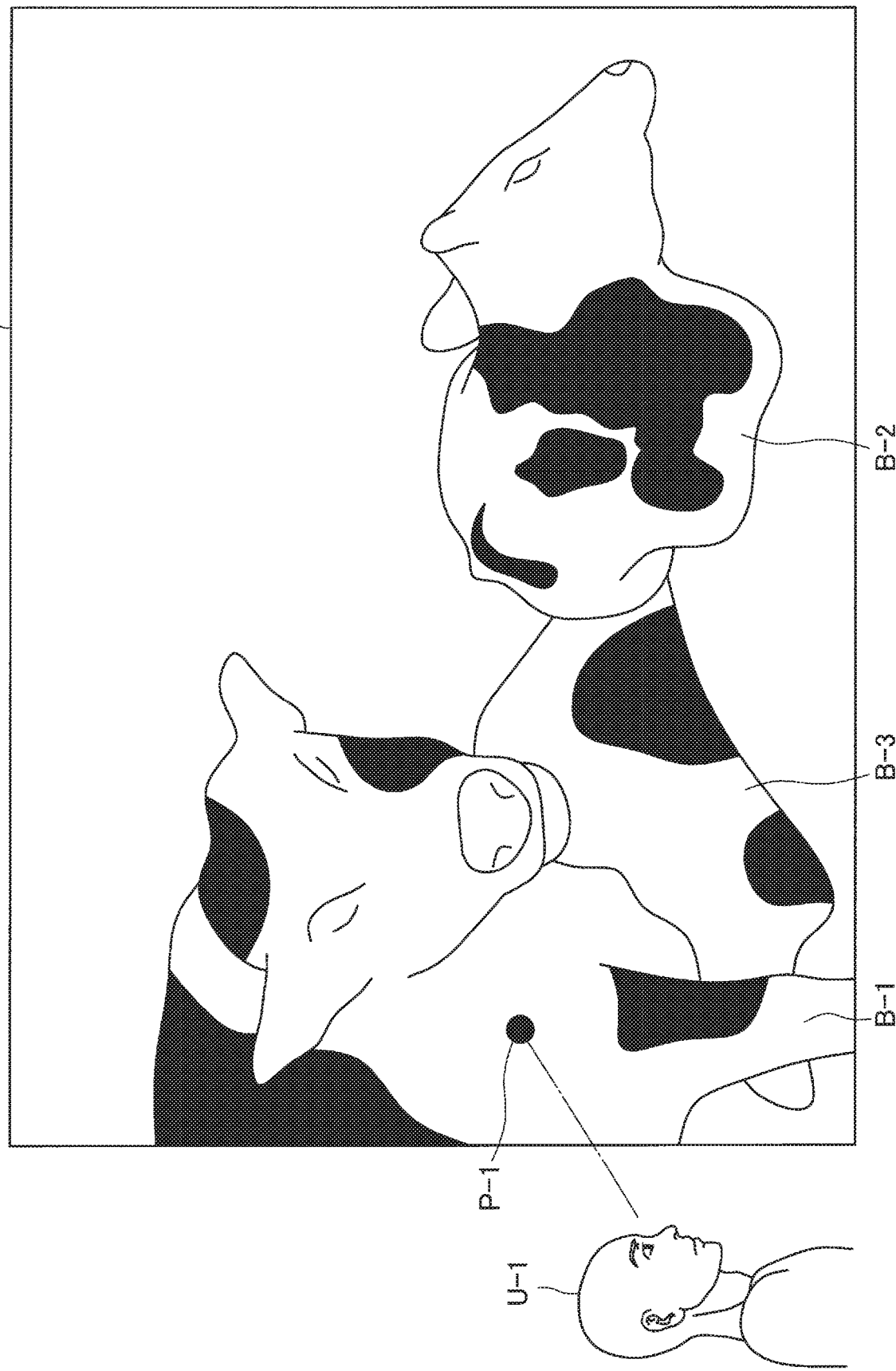
FIG. 4 is a diagram for describing an example of farm animal selection.

First, an example of selecting the farm animal B will be described. FIG. 4 is a diagram for describing an example of selecting the farm animal B. Referring to FIG. 4, a field of view V-1 of the user U-1 is illustrated. Further, there are farm animals B-1 to B-3 in the field of view V-1. In the display control device 10 worn by the user U-1, if the detecting unit 120 detects the direction of the display control device 10 and the position information of the display control device 10, the communication unit 130 transmits the direction of the display control device 10 and the position information of the display control device 10 to the server 20.

In the server 20, if the communication unit 230 receives the direction of the display control device 10 and the position information of the display control device 10, the information acquiring unit 211 decides the farm animals B-1 to B-3 located in the field of view V-1 on the basis of the direction of the display control device 10, the position information of the display control device 10, and the position information of each of the plurality of farm animals. If the individual information and the position information of each of the farm animals B-1 to B-3 located in the field of view V-1 are acquired by the information acquiring unit 211, the information providing unit 212 provides the individual information and the position information of each of the farm animals B-1 to B-3 located in the field of view V-1 to the display control device 10 via the communication unit 230. Further, the individual information will be described later in detail.

In the display control device 10, the communication unit 130 receives the individual information and the position information of each of the farm animals B-1 to B-3 located in the field of view V-1. Here, a case in which the user U-1 desires to know the individual information of the farm animal B-1 among the farm animals B-1 to B-3 is assumed. At this time, it is sufficient that the user U-1 matches the line of sight P-1 with the farm animal B-1. In the display control device 10, if the line of sight P-1 is detected by the detecting unit 120, the selecting unit 112 determines that the line of sight P-1 matches with the farm animal B-1 on the basis of the line of sight P-1 and the position information of each of the farm animal B-1 to B-3. The selecting unit 112 selects the farm animal B-1 with which the line of sight P-1 matches. At this time, the display control unit 111 may control display of a pointer to the position of the line of sight P-1. Accordingly, the user U-1 can easily comprehend the position of the line of sight P-1 in accordance with the position of the pointer. Here, the selection of the farm animal B-1 has been described, but the farm animal B-2 and the farm animal B-3 can also be selected similarly to the farm animal B-1.

Further, in the above example, the selecting unit 112 immediately selects the farm animal B-1 with which the line of sight P-1 matches in a case in which the line of sight P-1 matches with the farm animal B-1. However, the selecting unit 112 may not immediately select the farm animal B-1 in a case in which the line of sight P-1 matches with the farm animal B-1. For example, the selecting unit 112 may select the farm animal B-1 with which the line of sight P-1 matches during a predetermined period of time or more in a case in which the line of sight P-1 matches with the farm animal B-1 during a predetermined period of time or more.

The example of selecting the farm animal B has been described above. However, the selection of the farm animal B is not limited to such an example. FIG. 5 is a diagram for describing another example of selecting the farm animal B. Referring to FIG. 5, similarly to the example illustrated in FIG. 4, the field of view V-1 of the user U-1 is illustrated. Further, there are farm animals B-1 to B-3 in the field of view V-1. An operation before the individual information and the position information of each of the farm animals B-1 to B-3 located in the field of view V-1 are received by the display control device 10 is similarly to that in the example described with reference to FIG. 4.

Here, a case in which the user U-1 desires to know the individual information of the farm animal B-1 among the farm animals B-1 to B-3 is considered. At this time, it is sufficient if the user U-1 performs a motion corresponding to the position at which the farm animal B-1 is located in the field of view V-1 (for example, a wraparound action to a position at which the farm animal B-1 is located in the field of view V-1). For example, referring to FIG. 5, since the farm animal B-1 is located at the leftmost position in the field of view V-1, the wraparound action may be an action of wrapping around from the left (that is, an action of drawing clockwise when viewed from above).

In the display control device 10, if the wraparound action is detected by the detecting unit 120, the selecting unit 112 determines that the farm animal B-1 is located at a position corresponding to the wraparound action on the basis of the wraparound action and the position information of each of the farm animals B-1 to B-3. The selecting unit 112 selects the farm animal B-1 located at the position corresponding to the wraparound action. Further, in a case in which the user U-1 is considered to desire to know the individual information of the farm animal B-3 located at the far right in the field of view V-1, the wraparound action may be an operation that wraps around from the right (that is, an action of drawing counterclockwise when viewed from above).

Further, in the above example, the farm animal B-1 is selected on the basis of the line of sight of the user U-1 (or on the basis of the wraparound action) has been described. However, the technique for selecting the farm animal is not limited to this example. For example, the selecting unit 112 may select a farm animal located in a predetermined region in the field of view V-1. The predetermined region in the field of view V-1 may be a central region in the field of view V-1 or may be other regions in the field of view V-1.

The example of selecting the farm animal B has been described above.

(1.3.2. AR Display of Individual Information)

Figure 6:
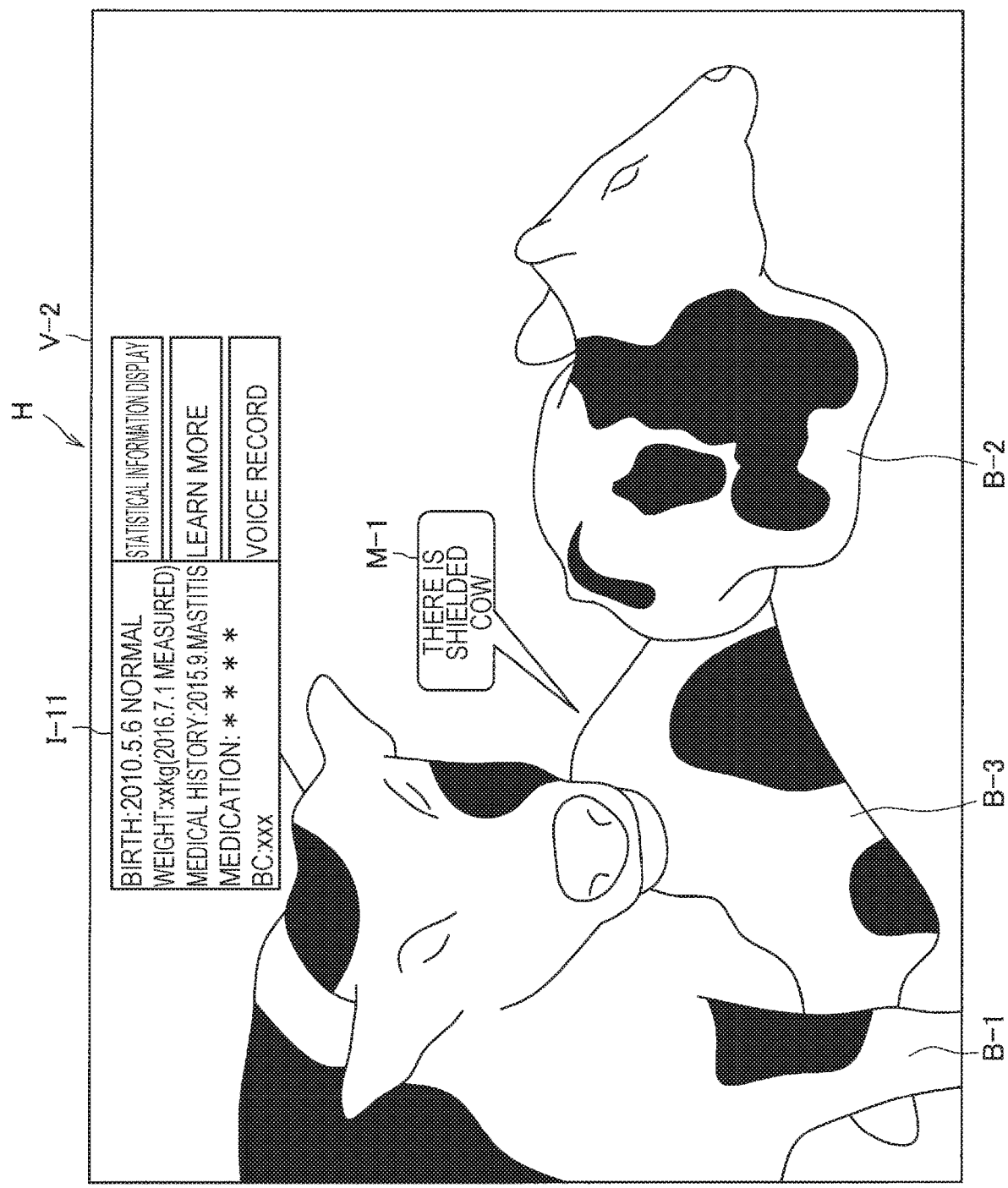
FIG. 6 is a diagram for describing an AR display example of the individual information of a farm animal and a first determination example in a case in which other farm animals are hard to see.

Next, an AR display example of the individual information of the farm animal B-1 selected by selecting unit 112 and a determination example in a case in which the farm animal B-3 is hard to see will be described. FIG. 6 is a diagram for describing the AR display example of the individual information of the farm animal B-1 and a first determination example in a case in which the farm animal B-3 is hard to see. Referring to FIG. 6, a field of view V-2 of the user U-1 is illustrated. Here, a case in which the farm animal B-1 is selected by the selecting unit 112 as described above is assumed.

In this case, the display control unit 111 controls the AR display of the individual information I-11 of the farm animal B-1 selected by the selecting unit 112. For example, it is sufficient if the display control unit 111 causes individual information I-11 of the farm animal B-1 selected by the selecting unit 112 to be AR-displayed at a position corresponding to the position at which the farm animal B-1 is located in the field of view V-2 (for example, a position near the position at which the farm animal B-1 is located in the field of view V-2). According to such a display, it is easy for the user U-1 to comprehend a correspondence between the farm animal B-1 and ARI-11 of the farm animal B-1 in the field of view V-2.

Further, in a case in which a switching manipulation is performed by the user, the selecting unit 112 may select the farm animal (the farm animal B-2 or the farm animal B-3) different from the currently selected the farm animal B-1. For example, the selecting unit 112 may select the next farm animal in order from the farm animal close to the user U-1 (for example, in the order of the farm animal B-2 and the farm animal B-3) each time the switching manipulation is performed.

In this specification, a case in which the individual information I-11 of the farm animal B-1 includes a birth (for example, a birth may include a date of birth and a birth state), a weight, a medical history, a medication, and a body condition (BC) is mainly assumed. However, the information included in the individual information I-11 of the farm animal B-1 is not limited thereto.

Further, as illustrated in FIG. 6, it is sufficient if the display control unit 111 controls display of information (hereinafter also referred to as "link information") connecting the farm animal B-1 in the field of view V-2 with the individual information I-11 of the farm animal B-1. As the link information is displayed, it is easier for the user U-1 to further comprehend the correspondence between the farm animal B-1 in the field of view V-2 and the individual information I-11 of the farm animal B-1.

Further, as described above, the individual information I-11 of the farm animal B-1 may be unconditionally AR-displayed at a position corresponding to the position at which the farm animal B-1 is located in the field of view V-2. However, a case in which the farm animal B-1 is moved is also assumed. In this case, in a case in which the position of the individual information I-11 is also moved with the movement of the farm animal B-1 in the field of view V-2, the individual information I-11 may not be seen well.

Therefore, in a case in which the farm animal B-1 is not moving, the display control unit 111 decides the position of the individual information I-11 of the farm animal B-1 on the basis of the position of the farm animal B-1 in the field of view V-2. On the other hand, the display control unit 111 may fix the position of the individual information I-11 of the farm animal B-1 in a case in which the farm animal B-1 is moving. At this time, in order to facilitate understanding of the correspondence between the farm animal B-1 in the field of view V-2 and the individual information I-11 of the farm animal B-1, it is sufficient if the link information is displayed. The position at which the individual information I-11 of the farm animal B-1 is fixed is not particularly limited.

Further, referring to FIG. 6, the display control unit 111 causes "statistical information display," "learn more," and "voice record" to be displayed, as selected items H, at a position corresponding to the position of the individual information I-11 of the farm animal B-1. If a selection manipulation on "statistical information display" is performed, statistical information obtained by comparing the farm animal B-1 with other farm animals is displayed.

If a selection manipulation on "learn more" is performed, further detailed information related to the farm animal B-1 is displayed. Detailed information is not particularly limited. For example, the detailed information may be a name of a doctor who has treated a disease of the farm animal B-1, may be a method of treating a disease of the farm animal B-1, may be information of parents of the farm animal B-1, or may be a delivery status of the farm animal B-1.

In a case in which a selection manipulation on "voice record" is performed, a voice input of comments related to the farm animal B-1 is received, and the comments related to the farm animal B-1 is recorded in the storage unit 150 by voice. The comments related to the farm animal B-1 may be any kind of comments. For example, the comments related to the farm animal B-1 may be comments related to a scheduled work to be performed later on the farm animal B-1. The comments related to the farm animal B-1 which are recorded in storage unit 150 by voice can be reproduced and referred to later.

In the display control device 10, the determining unit 113 determines whether or not it is hard for the user U-1 to see the farm animals B-1 to B-3. For example, the determining unit 113 performs determination of whether or not at least a part of the farm animal B-3 is shielded by another object with reference to the position of the user U-1 (hereinafter also referred to as "shielding determination")). FIG. 6 illustrates an example in which the determining unit 113 determines that a part of the farm animal B-3 is shielded by the farm animal B-1 when viewed the position of the user U-1. A similar determination may be performed on the farm animal B-1 and the farm animal B-2.

At this time, the display control unit 111 may display shielding notification information M-1 indicating the presence of the farm animal B-3 shielded by another object. As illustrated in FIG. 6, the shielding notification information M-1 may be information such as "there is a shielded cow," but specific content of the shielding notification information M-1 is not limited. Further, the display position of the shielding notification information M-1 is not limited, but as illustrated in FIG. 6, the display position of the shielding notification information M-1 is a position corresponding to the position of the farm animal B-3 shielded in the field of view V-2 (for example, in the vicinity of the position of the farm animal B-3 or the like).

Further, the shielding determination can be performed in any method. As an example, the shielding determination may be performed using an image. More specifically, in a case in which the display control device 10 includes an imaging device that images the field of view of the user U-1, the determining unit 113 determines that a part of the farm animal B-3 is shielded by another object in a case in which a first condition that a partial region of the farm animal B-3 are shown in a captured image of the field of view is satisfied, and a second condition that a region of another object is shown near the partial regions is satisfied. Further, the captured image may be a three-dimensional space data detected by a depth sensor.

In the example illustrated in FIG. 6, a partial region of the farm animal B-3 is shown in the captured image of the field of view, and the region of the farm animal B-1 is shown near to the partial region. In this case, the determining unit 113 may determine that a part of the farm animal B-3 is shielded by the farm animal B-1. Further, a third condition that a face of the farm animal B-3 is not shown in the captured image of the field of view may be added to the first condition and the second condition, or the first condition may be replaced with a condition that a ratio of the farm animal B-3 shown in the captured image of the field of view to the whole farm animal B-3 is less than a predetermined ratio.

As another example, the shielding determination may be performed using the position information of each of the user U-1 and the farm animal B-1. The determining unit 113 may determine that at least part of the farm animal B-3 is shielded by another object in a case in which the directions of the farm animal B-3 and another object coincide or are close to each other on the basis of the position of the user U-1, and the farm animal B-3 is farther than another object on the basis of the position of the user U-1.

In the example illustrated in FIG. 6, a case in which the direction of the farm animal B-3 based on the position of the user U-1 is close to the direction of the farm animal B-1 based on the position of the user U-1, and the farm animal B-3 is farther than the farm animal B-1 on the basis of the position of the user U-1 is assumed. In this case, the determining unit 113 may determine that a part of the farm animal B-3 is shielded by the farm animal B-1. Further, the position information of each of the user U-1 and the farm animal B-1 to B-3 can be obtained as described above.

The AR display example of the individual information of the farm animal B-1 and the first determination example in a case in which the farm animal B-3 is hard to see have been described. Next, a second determination example in a case in which the farm animal B-3 is hard to see will be described. FIG. 7 is a diagram for describing the AR display example of the individual information of the farm animal B-1 and the second determination example in a case in which it is difficult to see the farm animal B-3. Referring to FIG. 7, a field of view V-3 of the user U-1 is illustrated. Here, a case in which the farm animal B-1 is selected by the selecting unit 112 is assumed. In this case, as described with reference to FIG. 6, the display control unit 111 controls the AR display of the individual information I-11 of the farm animal B-1 selected by the selecting unit 112.

In the display control device 10, the determining unit 113 determines whether or not it is difficult for the user U-1 to see the farm animals B-1 to B-3. As an example, the determining unit 113 determines whether or not a predetermined display manipulation by the user U-1 is performed (for example, because the farm animal B-3 is hard to see). The predetermined display manipulation is not limited. However, as described above, the hands-free manipulation is desirable in work sites for the farm animals or the like.

In this regard, it is desirable that a predetermined display manipulation be a manipulation other than the touch manipulation and the button manipulation by the user U-1 (that is, it is desirable for the determining unit 113 to perform determination on the basis of whether or not a condition other than the presence or absence of the touch manipulation and the button manipulation by the user U-1 is satisfied). As illustrated in FIG. 7, the predetermined display manipulation may be an action of the user looking up (that is, an operation of tilting the top of the head of the user backward). However, the predetermined display manipulation is not limited to this example.

For example, the predetermined display manipulation may be an overlooking action (that is, an operation of tilting the top of the head of the user forward). Alternatively, the predetermined display manipulation may be an action of wrapping around from the left (that is, an action of drawing clockwise when viewed from above) or may be an action of wrapping around from the right (that is, an action of drawing counterclockwise when viewed from above). Alternatively, the predetermined display manipulation may be an action of looking in from below (that is, an action of tilting the top of the head in the left direction or the right direction) or may be a predetermined voice spoken by the user U-1 (for example, a speech). The predetermined display manipulation may be a continuation of these actions exceeding a predetermined period of time.

The AR display example of the individual information of the farm animal B-1 and the second determination example in a case in which the farm animal B-3 is hard to see have been described above. Next, a determination example in a case in which the farm animals B-1 to B-3 are hard to see will be described. FIG. 8 is a diagram for describing the AR display example of the individual information of the farm animal B-1 and a determination example in a case in which the farm animal B-1 to B-3 are hard to see.

Referring to FIG. 8, a field of view V-4 of the user U-1 is illustrated. Since the user U-1 and farm animals B-1 to B-3 are far from each other, the farm animals B-1 to B-3 are located in a small size in the field of view V-4. Here, a case in which the farm animal B-1 is selected by the selecting unit 112 is assumed. In this case, as described with reference to FIG. 6, the display control unit 111 controls the AR display of the individual information I-11 of the farm animal B-1 selected by the selecting unit 112.

In the display control device 10, the determining unit 113 determines whether or not it is difficult for the user U-1 to see the farm animals B-1 to B-3. As an example, in a case in which a distance between the user U-1 and the farm animals B-1 to B-3 exceeds a predetermined distance, it may be difficult for the user U-1 to see the farm animals B-1 to B-3. Therefore, the determining unit 113 determines whether or not a distance between the user U-1 and one of the farm animal B-1 to B-3 (for example, the farm animal B-1 located at the shortest distance from the user U-1 among the farm animals B-1 to B-3 B-1) exceeds a predetermined distance.

The display example of the individual information of the farm animal B-1 and the determination example in a case in which the farm animal B-1 to B-3 are hard to see have been described above. However, the determination example in a case in which the farm animals B-1 to B-3 are hard to see is not limited to these examples. For example, in a case in which any of the farm animals B-1 to B-3 takes a predetermined posture (for example, a sitting posture, a posture of turning back to the user U-1, or the like) or a predetermined motion (for example, movement or the like), it may be difficult for the user U-1 to see the farm animal.

Therefore, the determining unit 113 may determine whether or not a condition that one of the farm animals B-1 to B-3 takes a predetermined posture or a condition that a predetermined motion is being performed is satisfied. In the example illustrated in FIG. 7, the farm animal B-2 takes a sitting posture. At this time, it is sufficient if the determining unit 113 determines that a condition that the farm animal B-2 takes a sitting posture is satisfied.

The AR display example of the individual information of the farm animal B-1 and the determination example in a case in which the farm animal B-2 is hard to see have been described.

(1.3.3. VR Display of Image)

As described above, a case in which the determining unit 113 determines that the farm animal B-3 is hard to see is assumed. In this case, it is sufficient if the display control unit 111 controls the VR display of an image related to the farm animal B-3. According to such a configuration, the farm animal B-3 in which individual information I-31 (FIG. 11) is AR-displayed can be easily comprehended by the user U-1. At this time, it is sufficient if the display control unit 111 performs control such that the VR display of the image related to the farm animal B-3 is displayed in a form different from a form in which the farm animal B-3 shielded in the field of view is visually recognized by the user U-1.

Further, in this specification, an example in which the individual information of the farm animal B-1 is also continuously AR-displayed in a case in which the image related to the farm animal B-3 is VR-displayed will be mainly described. However, in a case in which the image related to the farm animal B-3 is VR-displayed, the individual information of the farm animal B-1 may not be displayed. In other words, a mode in which the image related to the farm animal B-3 is VR-displayed and the mode in which the individual information of the farm animal B-1 is AR-displayed may be switched. Further, in this specification, as the image related to the farm animal B-3, an overhead image will be described as an example. An angle of a space shown in the overhead image may be controllable by a manipulation by the user. However, the image related to the farm animal B-3 is not limited to such an example. For example, the image related to the farm animal B-3 may be 3D data which is created in advance.

For example, the image related to the farm animal B-3 may be an image obtained by imaging the farm animal B-3 from the head side, may be an image obtained by imaging the farm animal B-3 from the side, or may be an image obtained by imaging the farm animal B-3 from the buttock side. At this time, the image related to the farm animal B-3 may be the entire image captured by the external sensor 30 or may be a part of an image captured by the external sensor 30. Further, in a case in which a plurality of external sensors 30 is installed, the image related to the farm animal B-3 may be a synthetic image of images captured by a plurality of external sensors 30 or may be an image captured by any one of a plurality of external sensors 30.

The external sensor 30 may perform imaging once at a certain time point in the past. In this case, the image related to the farm animal B-3 does not change particularly from a certain time point in the past. However, the external sensor 30 may constantly perform imaging and update an old image with the latest image. In this case, the image related to the farm animal B-3 may be changed over time. Therefore, the user U-1 can comprehend a growth state of the farm animal B-3 by looking at the images related to the farm animal B-3. Further, the image related to the farm animal B-3 may be a predetermined object (for example, a picture, a mark, or the like) located at a position of the farm animal B-3 in a map or a two-dimensional image.

Figure 9:
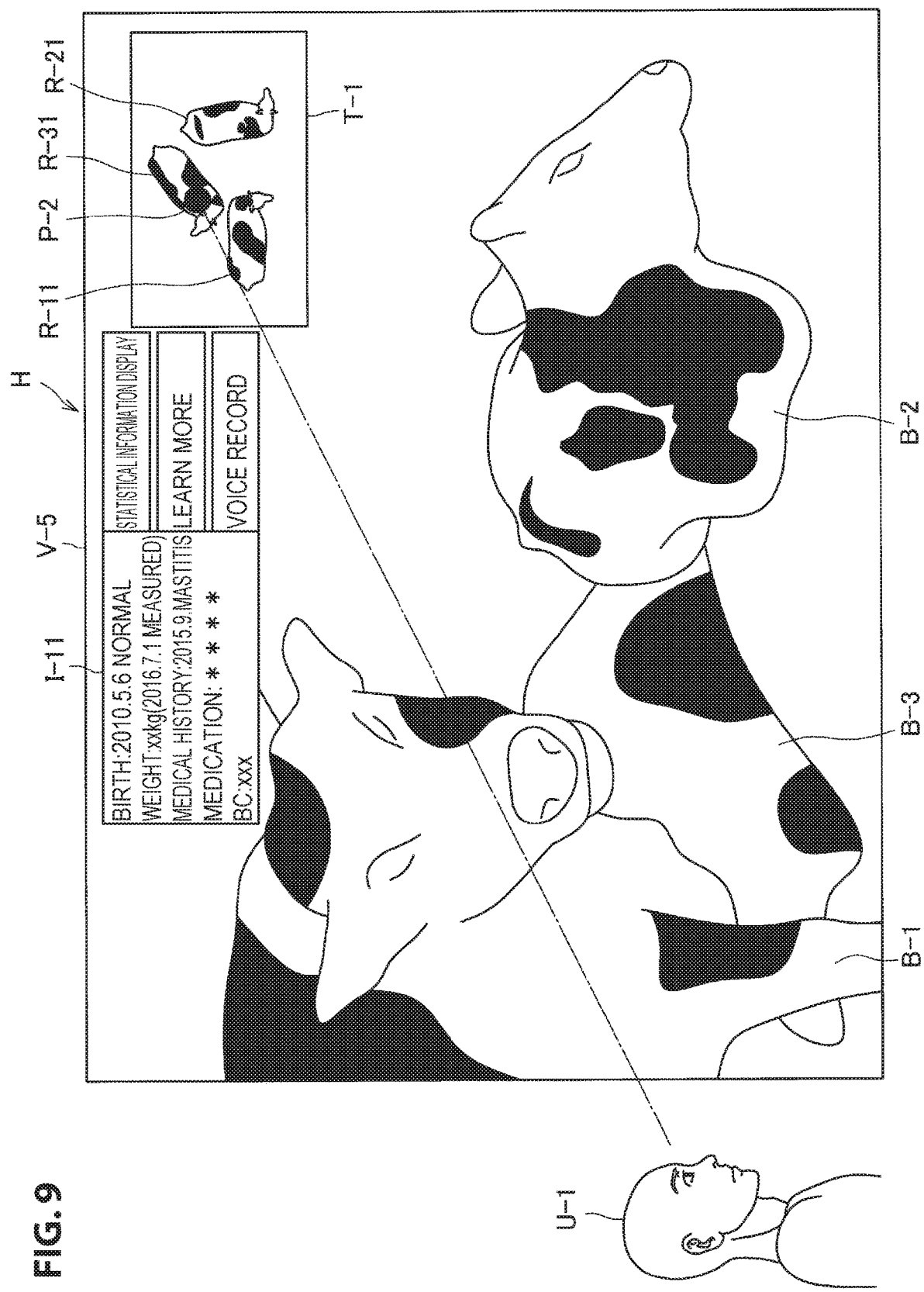
FIG. 9 is a diagram illustrating a display example of an overhead image.

FIG. 9 is a diagram illustrating a VR display example of the overhead image. Referring to FIG. 9, a field of view V-5 of the user U-1 is illustrated. In a case in which it is determined that the farm animal B-3 is hard to see, the display control unit 111 performs control such that the AR display in which the individual information of the farm animal B-3 is associated with the farm animal B-3. Here, the AR display may be display of causing the user U-1 to virtually recognize when the individual information of the farm animal B-3 is displayed in the space visually recognized by the user U-1 (for example, the link information or the like). Here, as described above, a case in which it is determined that the farm animal B-3 is hard to see is assumed. Specifically, it is determined that the farm animal B-3 is hard to see in a case in which it is determined that the farm animal B-3 is shielded by the farm animal B-1, in a case in which a predetermined display manipulation is performed, a case in which the distance between the user U-1 and one of the farm animals B-1 to B-3 exceeds a predetermined distance, or the like.

As described above, in a case in which it is determined that the farm animal B-3 is hard to see, the display control unit 111 causes an overhead image T-1 for selecting a shielded farm animal B-3 to be VR-displayed as illustrated in FIG. 9. Here, the VR display may be any one of at least an overhead image corresponding to the farm animal B-3, a three-dimensional image corresponding to the farm animal B-3, a captured image including an image in which the farm animal B-3 is not shielded. The overhead image T-1 includes an image R-31 related to the farm animal B-3 that is determined to be hard to see. In addition, the overhead image T-1 includes an image R-11 related to the farm animal B-1 and an image R-21 related to the farm animal B-2. Here, a case in which the user U-1 desires to know the individual information of the farm animal B-3 is assumed. At this time, it is sufficient if the user U-1 matches the line of sight P-2 with the image R-31 (related to the farm animal B-3) included in the overhead image T-1 instead of the farm animal B-3.

In the display control device 10, in a case in which a line of sight P-2 is detected by the detecting unit 120, the selecting unit 112 determines that the line of sight P-2 matches with the image R-31 related to the farm animal B-3 on the basis of the line of sight P-2 and the position information of the image R-31 (related to the farm animal B-3) in the overhead image T-1. The selecting unit 112 selects the farm animal B-3 corresponding to the image R-31 (for the farm animal B-3) with which the line of sight P-2 matches.

As described above, the farm animal B-3 determined to be hard to see can be easily selected through the VR display of the image R-31 related to the farm animal B-3. In particular, in a case in which many farm animals are located densely, it is difficult to select the farm animal B-3 located on the inner side on the basis of a scanning result of a barcode written on an ear tag, an image recognition result by a camera, or the like. On the other hand, the farm animal B-3 can be easily selected through the VR display of the image R-31 related to the farm animal B-3. Further, with the VR display of the image R-31 related to the farm animal B-3, it is unnecessary for the user U-1 to approach the farm animal B-3 and to scan the barcode, thus the work efficiency of the user U-1 is improved.

Further, the example in which, when the line of sight P-2 matches with the image R-31 related to the farm animal B-3, the selecting unit 112 immediately selects the farm animal B-3 corresponding to the image R-31 (related to the farm animal B-3) with which the line of sight P-2 matches has been described above. However, the selecting unit 112 may select the farm animal B-3 corresponding to the image R-31 (related to the farm animal B-3) with which the line of sight P-2 matches for more than a predetermined period of time when the line of sight P-2 matches with the image R-31 related to the farm animal B-3 for more than a predetermined period of time.

Further, a case in which a state in which at least a part of the farm animal B-3 is shielded by other objects transitions is also assumed. In this case, the display control unit 111 may control display of information indicating the presence of the image R-31 related to the farm animal B-3. Accordingly, if the user U-1 seeing the information indicating the presence of the image R-31 related to the farm animal B-3 performs a predetermined display manipulation, the image R-31 related to the farm animal B-3 is VR-displayed in accordance with the predetermined display manipulation.

The VR display example of the overhead image T-1 has been described above. Further, for example, the overhead image T-1 may be displayed in a case in which the user U-1 performs an action of looking down (for example, since the external sensor 30 installed above is hard to see from the user U-1 in a case in which the user U-1 is outdoors or the like). Alternatively, the overhead image T-1 may be displayed in a case in which the user U-1 performs an action of looking up (for example, since the external sensor 30 installed above is seen well from the user U-1 in a case in which the user U-1 is outdoors or the like).

Further, the display control unit 111 may erase the farm animal B-1 shielding at least a part of the farm animal B-3 from the field of view V-5 and replace the farm animal B-3 located in the field of view V-5 with the image related to the farm animal B-3. It is desirable that the image related to the farm animal B-3 be an image of a posture which is easily visually recognized. The image of the posture which is easily visually recognized may be an image obtained by imaging the farm animal B-3 from the side, may be an image obtained by imaging the farm animal B-3 from the head side, or may be an image obtained by imaging the farm animal B-3 from the buttock side. Further, it is desirable that the image of the posture which is easily visually recognized be an image obtained by imaging a posture that the farm animal B-3 is standing.

Further, a type of image may change depending on a type of display manipulation. For example, in a case in which the user U-1 performs an action of wrapping around from the left or the right, the image obtained by imaging the farm animal B-3 from the side may be displayed. Further, in a case in which the user U-1 performs an action of looking in from the bottom, the image obtained by imaging the farm animal B-3 from the bottom may be VR-displayed. Alternatively, a type of image may be designated by voice (for example, a speech) spoken by the user U-1.

Further, as described above, even in a case in which any one of the farm animals B-1 to B-3 takes a predetermined posture or in a case in which any one of the farm animals B-1 to B-3 is performing a predetermined motion, it may be difficult for the user U-1 to see the farm animal. For example, as illustrated in FIG. 6, in a case in which the farm animal B-2 taking a sitting posture, it may be difficult for the user U-1 to see the farm animal B-2.

In this case, it is sufficient if the display control unit 111 controls the VR display of the image related to the farm animal B-2. It is desirable that the image related to the farm animal B-2 be an image of a posture which is easily visually recognized. The image of the posture which is easily visually recognized may be an image obtained by imaging the farm animal B-2 from the side, may be an image obtained by imaging the farm animal B-2 from the head side, or may be an image obtained by imaging the farm animal B-2 from the buttock side. Further, it is desirable that the image of the posture which is easily visually recognized be an image obtained by imaging a posture that the farm animal B-2 is standing.

FIG. 10 is a diagram illustrating a VR display example of an image obtained by imaging the farm animal B-2 from the side. Referring to FIG. 10, a field of view V-6 of the user U-1 is illustrated. Here, as described above, a case in which the farm animal B-2 is determined to be hard to see (because it takes a sitting posture) is considered. As described above, in a case in which it is determined that the farm animal B-2 is hard to see (because it takes a sitting posture), the display control unit 111 causes a horizontal direction image T-2 obtained by imaging the farm animal B-2 from the side as illustrated in FIG. 10. The horizontal direction image T-2 includes an image R-22 related to the farm animal B-2 determined to be hard to see.

Here, a case in which the user U-1 is considered to desire to know the individual information of the farm animal B-2 is assumed. At this time, it is sufficient if the user U-1 matches the line of sight to the image R-22 (related to the farm animal B-2) included the horizontal direction image T-2.

In the display control device 10, if the line of sight is detected by the detecting unit 120, the selecting unit 112 determines that the line of sight matches with the image R-22 related to the farm animal B-2 on the basis of the line of sight and the position information of the image R-22 (related to the farm animal B-2) in the horizontal direction image T-2. The selecting unit 112 selects the farm animal B-2 corresponding to the image R-22 (related to the farm animal B-2) with which the line of sight matches.

The VR display example of the horizontal direction image T-2 has been described above. As described above, in a case in which the farm animal B-3 corresponding to the image R-31 (related to the farm animal B-3) is selected by the selecting unit 112 (the user U-1 selects the farm animal B-3 using the VR display), it is sufficient if the display control unit 111 controls the AR display of the individual information of the farm animal B-3. Further, as described above, in a case in which the farm animal B-2 corresponding to the image R-22 (related to the farm animal B-2) is selected by selecting unit 112, it is sufficient if the display control unit 111 controls the AR display of the individual information of the farm animal B-2. As an example, the AR display example of the individual information of the farm animal B-3 will be described.

FIG. 11 is a diagram illustrating an AR display example of the individual information of the farm animal B-3 selected by the selecting unit 112. Referring to FIG. 11, a field of view V-7 of the user U-1 is illustrated. The display control unit 111 controls the AR display of the individual information I-31 of the farm animal B-3 selected by selecting unit 112. Further, in the example illustrated in FIG. 11, it is VR-displayed at a position at which an image R 32 corresponding to the farm animal B-3 is seen well (for example, a position not overlapping other farm animals located in the field of view V-7) in field of view V-7, and link information connecting an image R32 with the individual information I-31 is displayed. Accordingly, it is easy for the user U-1 to further comprehend the farm animal B-3 corresponding to the individual information I-31.

Further, the example in which the overhead image T-1 is not displayed in a case in which the farm animal B-3 is selected by the selecting unit 112 has been described above. However, a timing at which the overhead image T-1 is not displayed is not limited to this example. For example, the overhead image T-1 may not be displayed by canceling a predetermined display manipulation by the user U-1.

More specifically, in a case in which the overhead image T-1 is VR-displayed when the user U-1 performs an action of looking up, the overhead image T-1 may not be displayed when the user U-1 performs an action of looking down. Alternatively, in a case in which the overhead image T-1 is VR-displayed when the user U-1 performs an action of looking down, the overhead image T-1 may not be displayed when the user U-1 performs an action of looking up.

The VR display example of the image related to the farm animal B-3 has been described above.

(1.3.4. Display of Identification Information)

The example in which the individual information of the farm animal is AR-displayed has been described above. However, the display control unit 111 may control display of the identification information of the farm animal in addition to the individual information of the farm animal. Accordingly, the user U-1 can more easily identify the farm animal located in the field of view by looking at the identification information of the farm animal. Here, an example in which an ID assigned by the user U-1 is displayed as an example of the identification information of the farm animal will be described.

FIG. 12 is a diagram illustrating a display example of the ID assigned by the user U-1. Referring to FIG. 12, a field of view V-8 of the user U-1 is illustrated. Further, the farm animals B-1 to B-3 are located in the field of view V-8. Here, if the identification number of the IOT device of the farm animal B-2 is transmitted from the wearable device 40 worn on the farm animal B-2 to the server 20, the ID corresponding to the identification number of the IOT device is transmitted from the server 20 to the display control device 10 as the ID of the farm animal B-2.

In the display control device 10, the display control unit 111 controls the display of the ID of the farm animal B-2. Specifically, if the position information of the farm animal B-2 is transmitted from the server 20, in the display control device 10, the display control unit 111 performs control such that the ID of the farm animal B-2 is displayed at a position at which the farm animal B-2 is located in the field of view V-8 on the basis of the position information of the farm animal B-2, the direction of the display control device 10 detected by the detecting unit 120, and the position information of the display control device 10.

At this time, it is sufficient if the display control unit 111 causes the ID of the farm animal B-2 to be displayed superimposed on the farm animal B-2 in the field of view V-8. Accordingly, it is easy to comprehend the correspondence between the ID of the farm animal B-2 and the farm animal B-2 located in the field of view V-8. More specifically, as illustrated in FIG. 12, it is sufficient if the display control unit 111 causes a number Z in which the ID of the farm animal B-2 is described to be displayed superimposed on the body of the farm animal B-2 in the field of view V-8 (for example, an abdomen). Further, the identification information of the farm animal B-1 and the identification information of the farm animal B-3 can also be displayed similarly to the identification information of the farm animal B-2.

The display of the identification information of the farm animal has been described above.

(1.3.5. AR Display of Plurality of Pieces of Individual Information)

The example in which only one piece of individual information of the farm animal is AR-displayed has been described above. However, the number of individual information of the farm animal which is AR-displayed at one time is not limited to one. Specifically, the individual information of each of a plurality of farm animals may be simultaneously AR-displayed. In other words, the display control unit 111 may control the AR display of the individual information of each of a plurality of farm animals in a case in which there are a plurality of farm animals in the field of view. An example in which the individual information of each of a plurality of farm animals is simultaneously AR-displayed will be described below.

FIG. 13 is a diagram illustrating an example in which the individual information of each of a plurality of farm animals is simultaneously AR-displayed. Referring to FIG. 13, a field of view V-9 of the user U-1 is illustrated. Further, the farm animal B-1 and B-2 are located in the field of view V-9. At this time, the display control unit 111 may control the AR display of the individual information I-11 of the farm animal B-1 and individual information I-21 of the farm animal B-2. For example, in a case in which the farm animals B-1 and B-2 are selected by the selecting unit 112, the display control unit 111 may control the AR display of the individual information I-11 of the farm animal B-1 and the individual information I-21 of the farm animal B-2.

FIG. 13 illustrates an example in which there are two pieces of individual information which are AR-displayed. At this time, a situation in which the two pieces of individual information overlap each other does not occur. However, as the number of individual information to be displayed increases, a situation in which a plurality of pieces of individual information overlaps each other may occur. In such a situation, a situation that there is individual information which is at least partially not displayed may occur.

In this regard, a technique for preventing a situation in which a plurality of pieces of individual information overlaps each other can be adopted.

Figure 14:
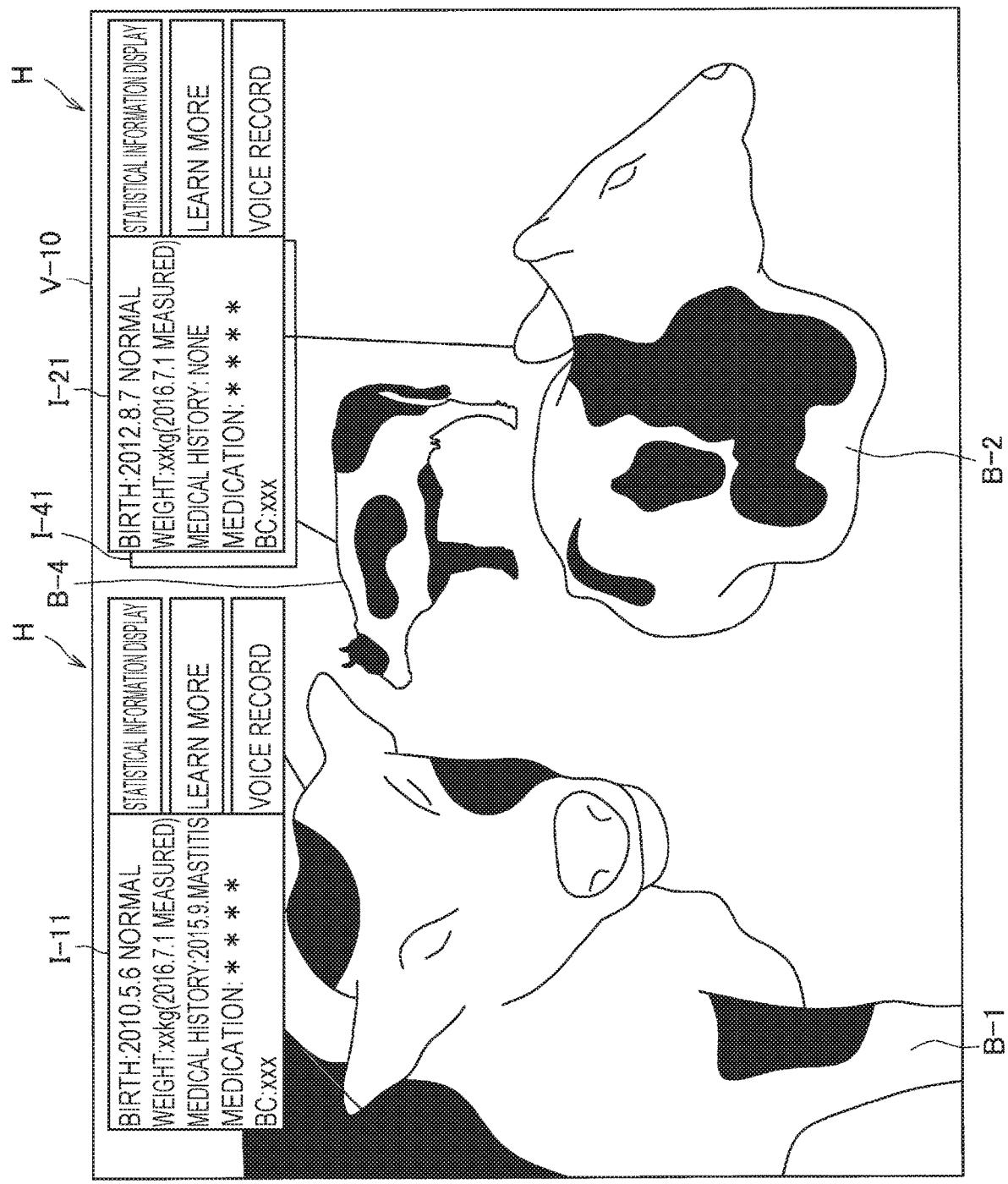
FIG. 14 is a diagram illustrating an example of a situation in which a plurality of pieces of the individual information overlaps each other.

FIG. 14 is a diagram illustrating an example of a situation in which a plurality of pieces of individual information overlaps each other. Referring to FIG. 14, a field of view V-10 of the user U-1 is illustrated. Further, a farm animal B-4 is located in the field of view V-10 in addition to the farm animals B-1 and B-2. At this time, as illustrated in FIG. 14, the display control unit 111 may control the AR display of the individual information I-11 of the farm animal B-1, the individual information I-21 of the farm animal B-2, and individual information I-41 of the farm animal B-4. For example, in a case in which the farm animals B-1, B-2, and B-4 are selected by the selecting unit 112, the display control unit 111 may control the AR display of the individual information I-11 of the farm animal B-1, the individual information I-21 of the farm animal B-2, and the individual display I-41 of the farm animal B-4.

However, referring to FIG. 14, the individual information I-21 of the farm animal B-2 and the individual information I-41 of the farm animal B-4 overlap each other. In this regard, it is sufficient if the display control unit 111 stops the AR display of the individual information of each of a plurality of farm animals in a case in which the density of the individual information of each of a plurality of farm animals is higher than a predetermined density. Further, it is sufficient if the display control unit 111 controls the VR display of the image related to each of a plurality of farm animals in a case in which the density of the individual information of each of a plurality of farm animals is higher than a predetermined density.

In the example illustrated in FIG. 14, since the individual information I-41 of the farm animal B-4 is not seen, the display control unit 111 may stop the AR display of the individual information I-41 of the farm animal B-4 and control the VR display of the image related to the farm animal B-4. Further, the display control unit 111 may stop the AR display of the individual information I-11 of the farm animal B-1 and control the VR display of the image related to the farm animal B-2. Further, the display control unit 111 may stop the AR display of the individual information I-21 of the farm animal B-2 and control the VR display of the image related to the farm animal B-2.

The display control unit 111 may control the display or the non-display of the individual information of each of a plurality of farm animals in a case in which the density of the individual information of each of a plurality of farm animals is higher than a predetermined density. For example, the display control unit 111 may hide only the individual information I-41 which is partially not seen. Alternatively, the display control unit 111 may hide only the individual information with which the line of sight of the user U-1 does not match.

Alternatively, the display control unit 111 may control a display positions of the individual information of each of a plurality of farm animals in a case in which the density of the individual information of each of a plurality of farm animals is higher than a predetermined density. For example, the display control unit 111 may select a position that does not overlap with the individual information I-11 and the individual information I-21 as the display position of the individual information I-41 which is not partially seen.

Alternatively, the display control unit 111 may control an information amount of the individual information of each of a plurality of farm animals in a case in which the density of the individual information of each of a plurality of farm animals is higher than a predetermined density. For example, the display control unit 111 may reduce the information amount of the individual information of each of a plurality of farm animals in a case in which the density of the individual information of each of a plurality of farm animals is higher than a predetermined density.

FIG. 15 is a diagram illustrating an example of reducing the information amount of the individual information of each of a plurality of farm animals. Referring to FIG. 15, a field of view V-11 of the user U-1 is illustrated. Further, the farm animal B-4 is located in the field of view V-11 in addition to the farm animals B-1 and B-2. At this time, as illustrated in FIG. 14, in addition to the individual information I-11 of the farm animal B-1, the display control unit 111 may control the AR display of the individual information I-22 of the farm animal B-2 and the individual information I-42 of the farm animal B-4 whose information amount is reduced. Thereby, it is possible to prevent a situation in which a plurality of pieces of individual information overlaps each other.

Only the birth among the birth, the weight, the medical history, the medication, and the BC remains in the individual information I-22 of the farm animal B-2 and the individual information I-42 of the farm animal B-4, but an item to be deleted is not particularly limited. Further, in the example illustrated in FIG. 15, only the information amount of the individual information I-22 of the farm animal B-2 and the individual information I-42 of the farm animal B-4 overlapping each other is reduced, but the information amount of the individual information I-11 of the farm animal B-1 not overlapping with other individual information may be reduced.

The example in which the individual information of a plurality of farm animals is AR-displayed has been described above.

(1.3.6. Operation Examples)

Figure 16:
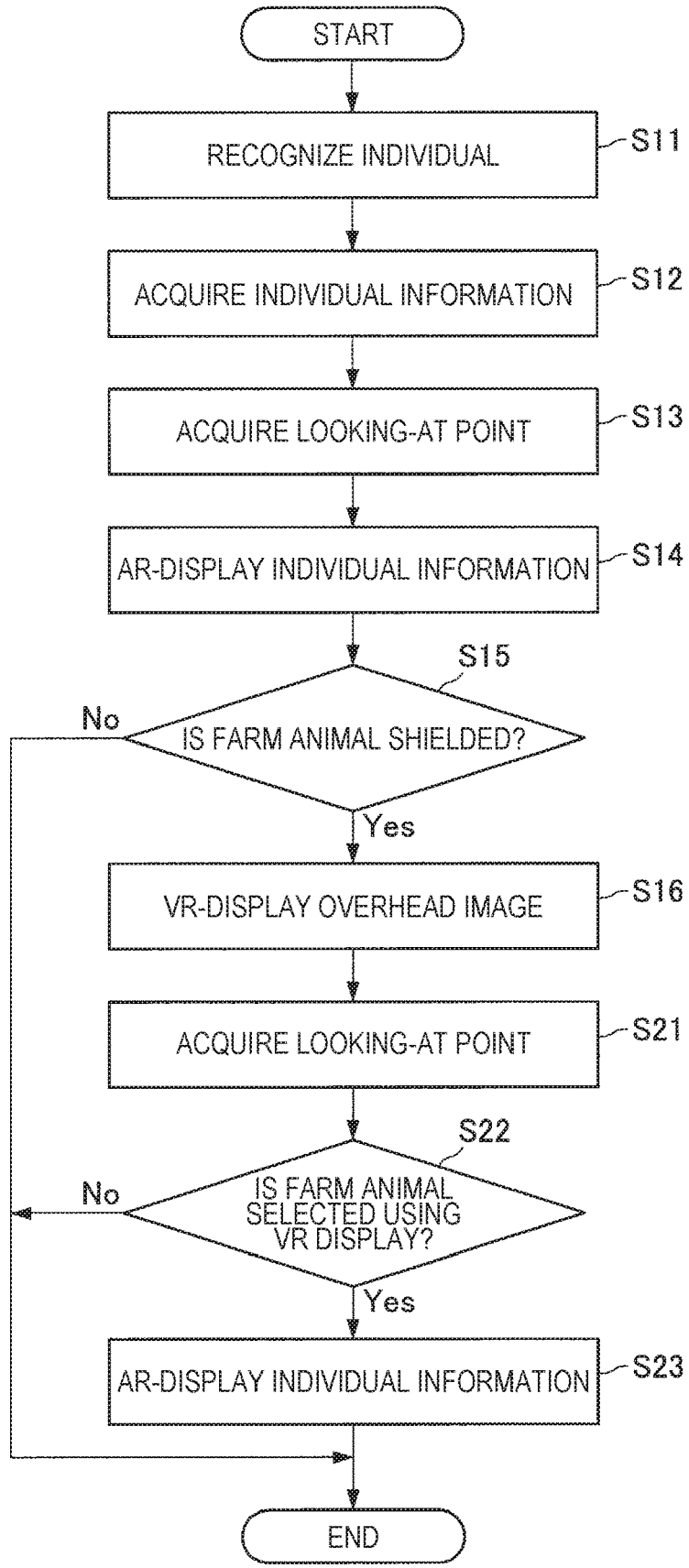
FIG. 16 is a flowchart illustrating a first example of an operation of a display control system according to an embodiment of the present disclosure.

Next, a first example of the operation of the display control system 1 according to an embodiment of the present disclosure will be described. FIG. 16 is a flowchart illustrating the first example of the operation of the display control system 1 according to an embodiment of the present disclosure. Further, the flowchart illustrated in FIG. 16 merely indicates an example of the operation of the display control system 1. Therefore, the operation of the display control system 1 is not limited to the operation example of the flowchart illustrated in FIG. 16.

First, the server 20 specifies the position information of the farm animals B-1 to B-N on the basis of the information specifying the position information of the farm animals B-1 to B-N. As described above, the individual recognition is performed by the server 20 (S11). In the server 20, if the information acquiring unit 211 acquires the individual information and the position information of each of the farm animals B-1 to B-3 located in the field of view V-1 (S12), the information providing unit 212 provides the individual information and the position information of each of the farm animals B-1 to B-3 located in the field of view V-1 to the display control device 10 via the communication unit 230.

Then, in the display control device 10, if the selecting unit 112 acquires a looking-at point at which the user U-1 is looking (S13), the farm animal B-1 in which the user U-1 is interested is selected on the basis of the looking-at point and the position information of each of the farm animals B-1 to B-3. The display control unit 111 controls the AR display of the individual information I-11 of the selected farm animal B-1 (S14).

Then, the determining unit 113 determines whether or not one of the farm animals B-1 to B-3 is shielded by another object (S15). In a case in which there is a farm animal shielded by another object ("Yes" in S15), the display control unit 111 controls the VR display of the overhead image (S16), and the selecting unit 112 acquires the looking-at point of the user U-1 (S21), and in a case in which the farm animal shielded by another object is selected by the selecting unit 112 using the VR display (for example, since the looking-at point is on the overhead image) ("Yes" in S22), the display control unit 111 controls the display of the individual information of the farm animal (S23), and ends the operation. In a case in which the farm animal shielded by another object is not selected using the VR display ("No" in S22), the display control unit 111 ends the operation. On the other hand, the display control unit 111 ends the operation in a case in which there is no farm animal shielded by another object ("No" in S15).

Figure 17:
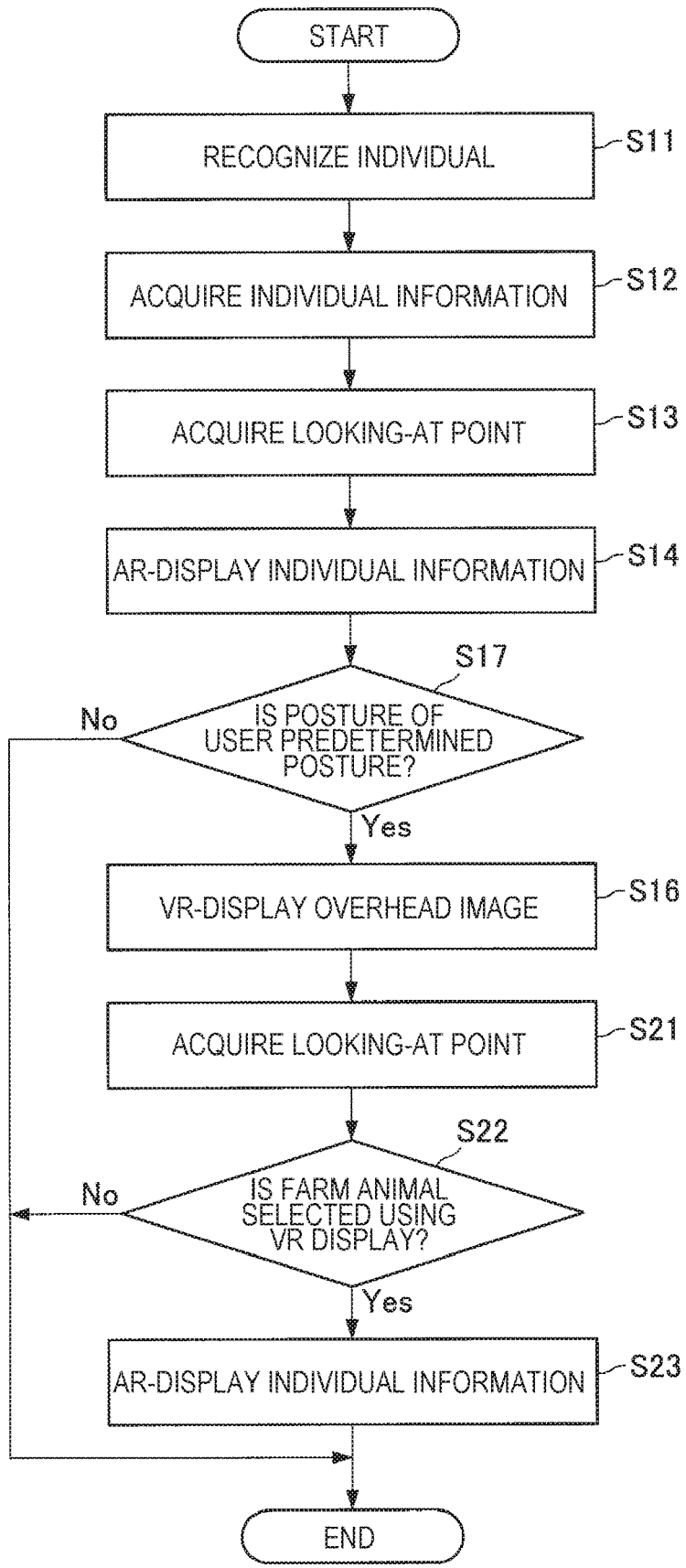
FIG. 17 is a flowchart illustrating a second example of an operation of a display control system according to the embodiment.

Next, a second example of the operation of the display control system 1 according to an embodiment of the present disclosure will be described. FIG. 17 is a flowchart illustrating the second example of the operation of the display control system 1 according to an embodiment of the present disclosure. Further, the flowchart illustrated in FIG. 17 merely indicates an example of the operation of the display control system 1. Therefore, the operation of the display control system 1 is not limited to the operation example of the flowchart illustrated in FIG. 17.

S11 to S14 can be executed as described with reference to FIG. 16. Then, the determining unit 113 determines whether or not the posture of the user U-1 is a predetermined posture (S17). In a case in which the posture of the user U-1 is a predetermined posture ("Yes" in S17), S16 and S21 to S23 are executed as described with reference to FIG. 16, and the operation ends. On the other hand, in a case in which the posture of the user U-1 is a predetermined posture ("No" in S17), the display control unit 111 ends the operation.

Figure 18:
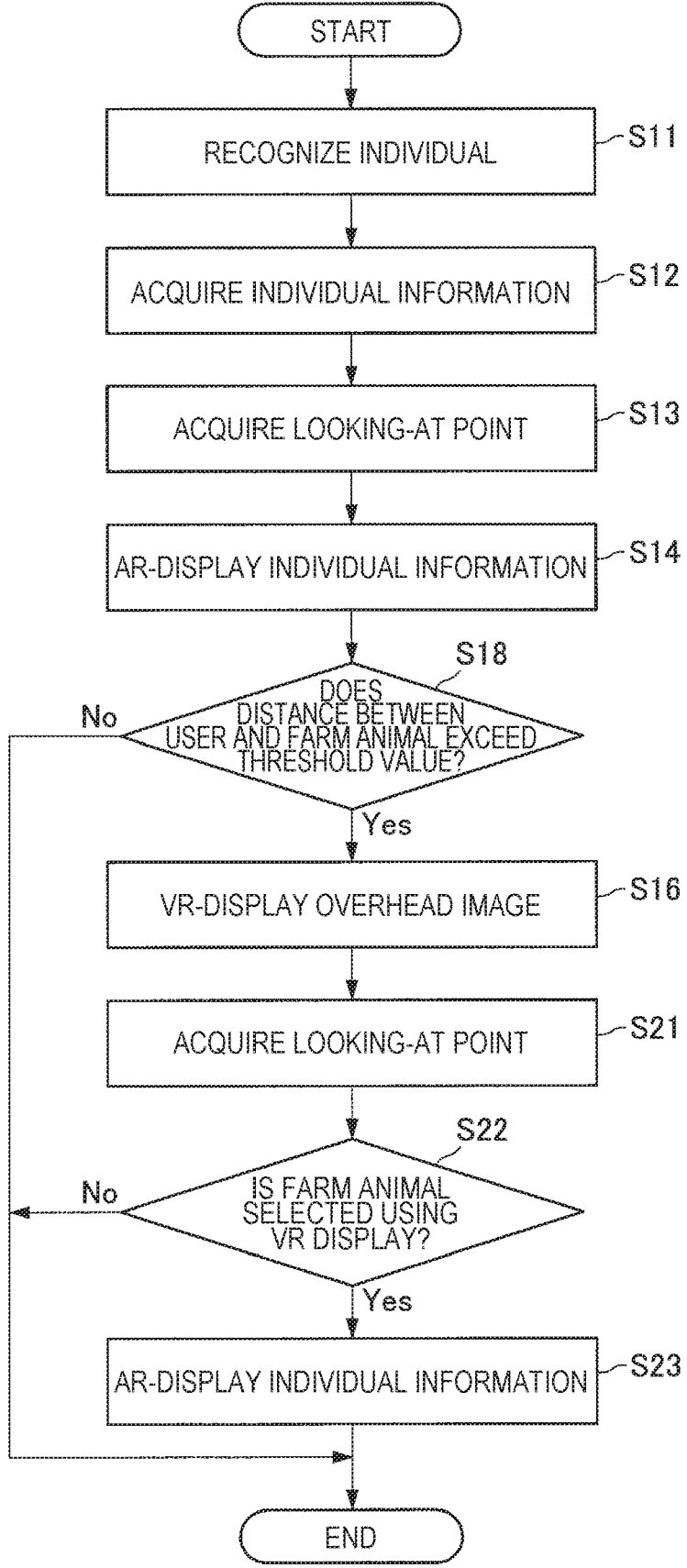
FIG. 18 is a flowchart illustrating a third example of an operation of a display control system according to the embodiment.

Next, a third example of the operation of the display control system 1 according to an embodiment of the present disclosure will be described. FIG. 18 is a flowchart illustrating the third example of the operation of the display control system 1 according to an embodiment of the present disclosure. Further, the flowchart illustrated in FIG. 18 merely indicates an example of the operation of the display control system 1. Therefore, the operation of the display control system 1 is not limited to the operation example of the flowchart illustrated in FIG. 18.

S11 to S14 can be executed as described with reference to FIG. 16. Then, the determining unit 113 determines whether or not the distance between the user U-1 and the farm animals B-1 to B-3 (for example, the distance from the user U-1 to the farm animal closes to the user U-1) exceeds a threshold value (S18). In a case in which the distance between the user U-1 and the farm animals B-1 to B-3 exceeds the threshold value ("Yes" in S 18), the display control unit 111 executes S16 and S21 to S23 as described with reference to FIG. 16, and ends the operation. On the other hand, in a case in which the distance between the user U-1 and the farm animal B-1 to B-3 does not exceed the threshold value ("No" in S 18), the display control unit 111 ends the operation.

Figure 19:
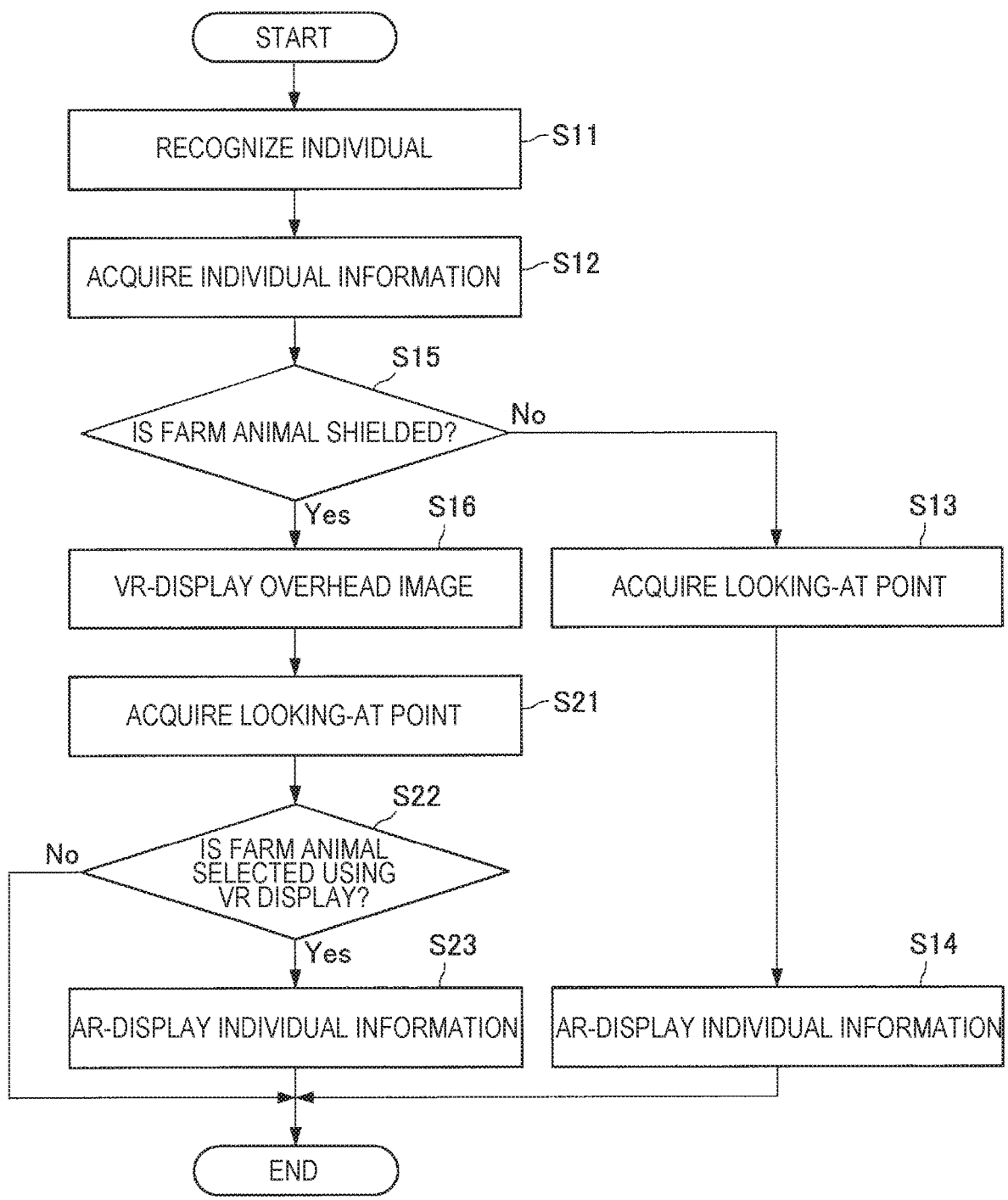
FIG. 19 is a flowchart illustrating a modified example of the first example of the operation of the display control system according to the embodiment.

Next, a modified example of the first example of the operation of the display control system 1 according to an embodiment of the present disclosure will be described. FIG. 19 is a flowchart illustrating the modified example of the first example of the operation of the display control system 1 according to an embodiment of the present disclosure. Further, the flowchart illustrated in FIG. 19 merely indicates an example of the operation of the display control system 1. Therefore, the operation of the display control system 1 is not limited to the operation example of the flowchart illustrated in FIG. 19.

First, the server 20 specifies the position information of the farm animals B-1 to B-N on the basis of the information specifying the position information of the farm animals B-1 to B-N. As described above, the individual recognition is performed by the server 20 (S11). In the server 20, if the information acquiring unit 211 acquires the individual information and the position information of each of the farm animals B-1 to B-3 located in the field of view V-1 (S12), the information providing unit 212 provides the individual information and the position information of each of the farm animals B-1 to B-3 located in the field of view V-1 to the display control device 10 via the communication unit 230.

Then, in the display control device 10, the determining unit 113 determines whether or not one of the farm animals B-1 to B-3 is shielded by another object (S15). In the case in which there is a farm animal shielded by another object exists ("Yes" in S15), S16 and S21 to S23 are executed as described with reference to FIG. 16, and the operation ends. On the other hand, in a case in which there is no farm animal shielded by another object ("No" in S15), the operation ends.

Figure 20:
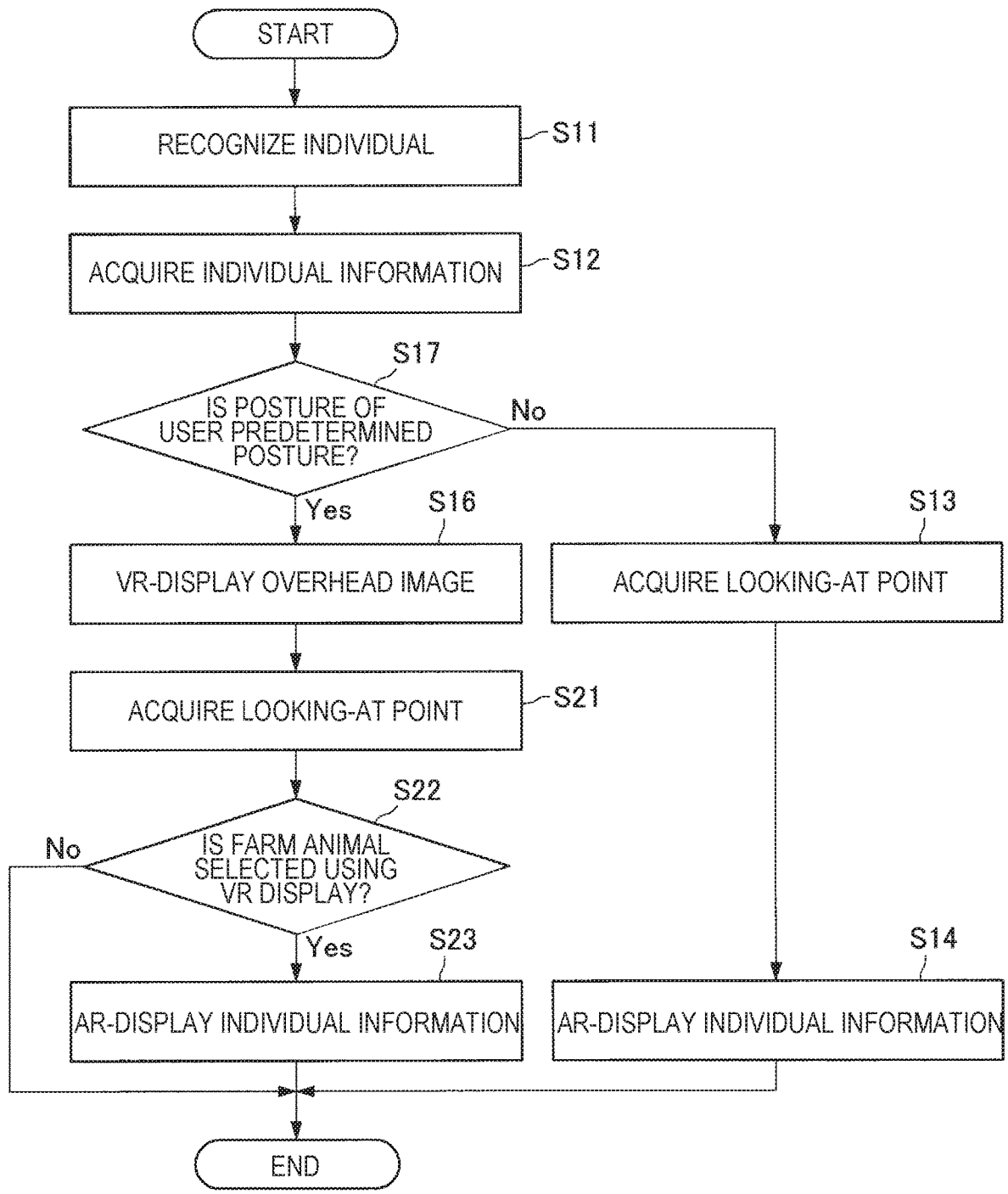
FIG. 20 is a flowchart illustrating a modified example of the second example of the operation of the display control system according to the embodiment.

Next, a modified example of the second example of the operation of the display control system 1 according to an embodiment of the present disclosure will be described. FIG. 20 is a flowchart illustrating the modified example of the second example of the operation of the display control system 1 according to an embodiment of the present disclosure. Further, the flowchart illustrated in FIG. 20 merely indicates an example of the operation of the display control system 1. Therefore, the operation of the display control system 1 is not limited to the operation example of the flowchart illustrated in FIG. 20.

S11 to S12 can be executed as described with reference to FIG. 16. Then, the determining unit 113 determines whether or not the posture of the user U-1 is a predetermined posture (S17). In a case in which the posture of the user U-1 is a predetermined posture ("Yes" in S17), S16 and S21 to S23 are executed as described with reference to FIG. 16, and the operation ends. On the other hand, in a case in which the posture of the user U-1 is a predetermined posture ("No" in S17), as described with reference to FIG. 16, S13 to S14 are executed and the operation ends.

Figure 21:
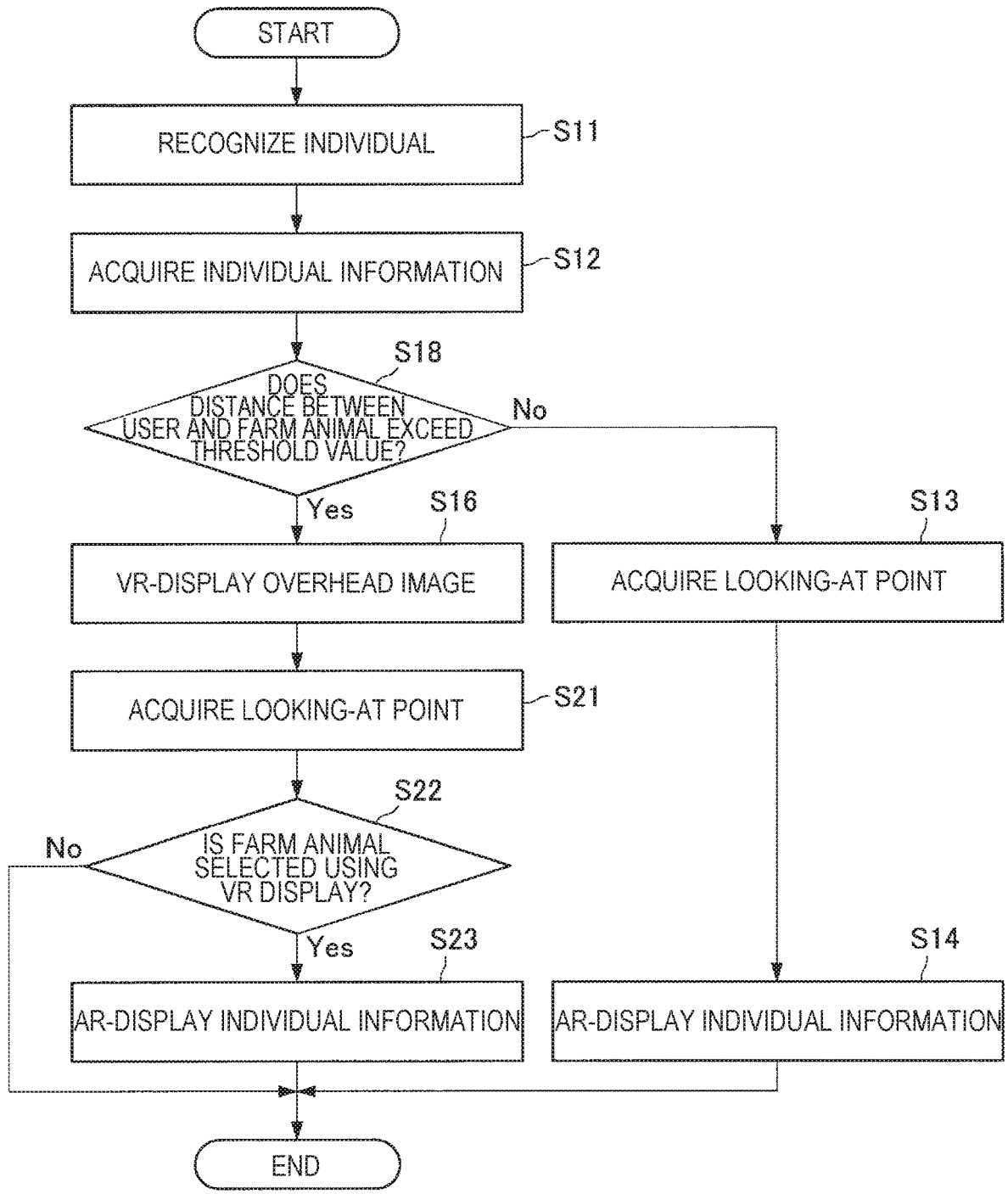
FIG. 21 is a flowchart illustrating a modified example of the third example of the operation of the display control system according to the embodiment.

Next, a modified example of the third example of the operation of the display control system 1 according to an embodiment of the present disclosure will be described. FIG. 21 is a flowchart illustrating the modified example of the third example of the operation of the display control system 1 according to an embodiment of the present disclosure. Further, the flowchart illustrated in FIG. 21 merely indicates an example of the operation of the display control system 1. Therefore, the operation of the display control system 1 is not limited to the operation example of the flowchart illustrated in FIG. 21.

S11 to S12 can be executed as described with reference to FIG. 16. Then, the determining unit 113 determines whether or not the distance between the user U-1 and the farm animals B-1 to B-3 (for example, the distance from the user U-1 to the farm animal closes to the user U-1) exceeds a threshold value (S18). In a case in which the distance between the user U-1 and the farm animals B-1 to B-3 exceeds the threshold value ("Yes" in S 18), S16 and S21 to S23 are executed as described with reference to FIG. 16, and the operation ends. On the other hand, in a case in which the distance between the user U-1 and the farm animal B-1 to B-3 does not exceed the threshold value ("No" in S 18), as described with reference to FIG. 16, S13 to S14 are executed and the display control unit 111 ends the operation.

The example of the operation of the display control system 1 according to an embodiment of the present disclosure has been described above.

[1.4. Various Modified Examples]

Next, various types of modified examples according to an embodiment of the present disclosure will be described. The example in which one target object whose AR information is presented to the user is a farm animal has been described above. However, one target object whose AR information is presented to the user is not limited to a farm animal. For example, one target object whose AR information is presented to the user may be an athlete. An example in which one target object whose AR information is presented to the user is an athlete will be described below.

Figure 22:
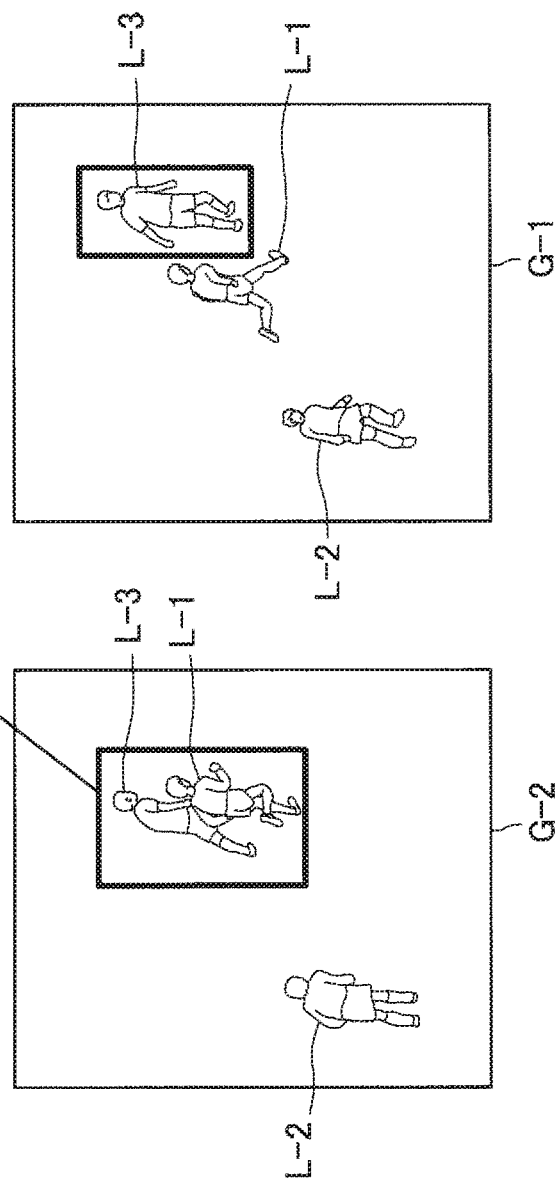
FIG. 22 is a diagram for describing a case in which one target object whose AR information is presented to a user is an athlete.

FIG. 22 is a diagram for describing an example in which one target object whose AR information is presented to the user is an athlete. In the example illustrated in FIG. 22, a situation in which a coach of a group competition corresponds to the user U-1 described above and gives an instruction to players while viewing information related to the players is assumed. Referring to FIG. 22, players L-1 to L-3 are located in a field of view G-2 of the coach. Further, display of information related to the athlete L-3 (hereinafter also referred to as "player information") J-31 is controlled by the display control unit 111.

In a case in which at least a part of a player on the inner side is shielded by the players on the front side, display of information related to the players on the inner side may be controlled by the display control unit 111 in accordance with the wraparound action of the coach such that the information related to the player on the inner side is visible to the coach. Further, the information related to the player which is far away may be enlarged by the display control unit 111, and the VR display may be controlled. The VR display of the image may be controlled by the display control unit 111 when the coach performs an action of looking up or an action of looking down. Here, the image may be a three-dimensional image captured by the external sensor 30 or may be a map or a two-dimensional image.

Further, if it is possible to transfer a voice from the coach to the athletes (for example, using a headset or the like) at the time of practice, the coach can select the player through the line of sight and give an instruction to the selected player from the headset. In a case in which the coach tracks a moving player with the eyes (or in a case in which a player is specified by voice), display of a movement trajectory of the player may be controlled by the display control unit 111 and confirmed by the coach.

In the case in which at least a part of a player on the inner side are shielded by the player on the front side, the display control unit 111 may control display of the player on the inner side by sequential transmission by the coach. In FIG. 22, in the field of view G-2, a part of the player L-3 is shielded by the player L-1, but the entire player L-3 is visible in the field of view G-1 after the field of view G-2 in accordance with the sequential transmission manipulation by the coach. Further, the player L-1 may be deleted by the display control unit 111, or the player L-3 may be rearranged at a position which is not shielded by the player L-1 by the display control unit 111 (may be VR-displayed).

Further, a previous action of an athlete may be replayed by the display control unit 111 in accordance with an instruction by voice, an action of matching the line of sight with a GUI menu, an instruction by gesture, or the like. The information to be displayed includes a war experience, a physical characteristic, a training situation, a moving picture of past games or exercises, analysis results thereof, or the like. Further, it is possible to replay similar formations performed in the past and perform a strategy simulation through the VR using a prediction algorithm.

The example in which one target object whose AR information is presented to the user is an athlete has been described above.

The embodiment of the present disclosure can be applied to various applications. Meta information may be superimposed on an object visible to the user under a microscope by the display control unit 111. Alternatively, one target object whose AR information is presented to the user may be an animal living in a zoo. Alternatively, one target object whose AR information is presented to the user may be a fish being cultured.

Further, the meta information may be superimposed on an object which can be freely moved by the user (such as stationery, tools, small devices, or the like) by the display control unit 111 if needed. Accordingly, it is possible for the user to search for the object moved by the other user without permission. At this time, the meta information of the object placed in a direction the user is looking at may be controlled by the display control unit 111.

The example in which the information is output by the display has been mainly described above. However, the output unit 160 may output the information by voice. For example, in a case in which the user touches a cow, the output unit 160 may read a condition of the cow aloud. Further, in a case in which the condition of the cow is bad, the output unit 160 may output an alert. Further, in a case in which the output unit 160 fails to recognize the target object located in the field of view of the user, a plurality of target object candidates may be output. At this time, the user may select one candidate from a plurality of candidates.

The various types of modified examples related to an embodiment of the present disclosure have been described above.

[1.5. Hardware Configuration Example]

Figure 23:
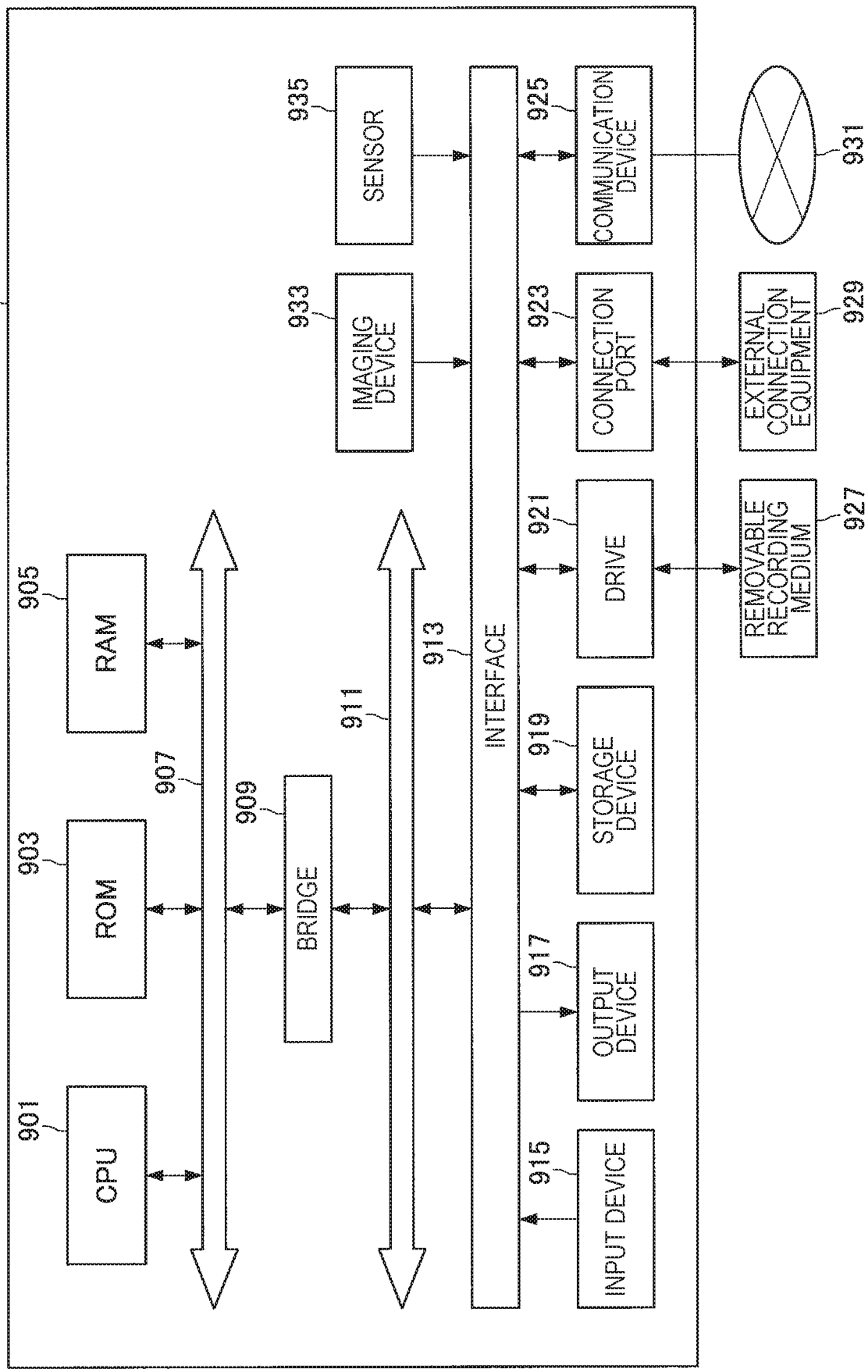
FIG. 23 is a block diagram illustrating a hardware configuration example of a display control device.

Next, with reference to FIG. 23, a hardware configuration of the display control device 10 according to the embodiment of the present disclosure will be described. FIG. 23 is a block diagram illustrating the hardware configuration example of the display control device 10 according to the embodiment of the present disclosure.

As illustrated in FIG. 23, the display control device 10 includes a central processing unit (CPU) 901, read only memory (ROM) 903, and random access memory (RAM) 905. The control unit 110 can be realized by the CPU 901, the ROM 903 and the ROM 905. In addition, the display control device 10 may include a host bus 907, a bridge 909, an external bus 911, an interface 913, an input device 915, an output device 917, a storage device 919, a drive 921, a connection port 923, and a communication device 925. Moreover, the display control device 10 may include an imaging device 933 and a sensor 935, as necessary. The display control device 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the display control device 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a button. The input device 915 may include a mouse, a keyboard, a touchscreen, a button, a switch, a lever and the like. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the display control device 10. The input device 915 includes an input control circuit that generates input signals on the basis of information which is input by a user to output the generated input signals to the CPU 901. A user inputs various types of data and indicates a processing operation to the display control device 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger. Further, the detecting unit 120 can be realized by the input device 915.

The output device 917 includes a device that can visually or audibly report acquired information to a user. The output device 917 may be, for example, a display device such as a liquid crystal display (LCD), an organic electro-luminescence (EL), a sound output device such as a speaker or a headphone, or the like. Further, the output device 917 may include a plasma display panel (PDP), a projector, a hologram, a printer, or the like. The output device 917 outputs a result obtained through a process performed by the display control device 10, in the form of text or video such as an image, or sounds such as voice and audio sounds. In addition, the output device 917 may include a light or the like to light the surroundings. Further, the output unit 160 can be realized by the output device 917.

The storage device 919 is a device for data storage that is an example of the storage unit of the display control device 10. The storage device 919 includes, for example, a magnetic storage device such as a hard disk drive (HDD), a semiconductor storage device, an optical storage device, or a magneto-optical storage device. The storage device 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the display control device 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the display control device 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the display control device 10 and the external connection equipment 929.

The communication device 925 is a communication interface including, for example, a communication device for connection to the network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. The network 931 to which the communication device 925 connects is a network established through wired or wireless connection. The network 931 is, for example, the Internet, a home LAN, infrared communication, radio communication, or satellite communication. Further, the communication unit 130 can be realized by the communication device 925.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image. Further, the detecting unit 120 can be realized by the imaging device 933.

The sensor 935 is various sensors such as a ranging sensor, an acceleration sensor, a gyro sensor, a geomagnetic sensor, a vibration sensor, an optical sensor, and a sound sensor. The sensor 935 acquires information regarding a state of the display control device 10 such as a posture of a housing of the display control device 10, and information regarding an environment surrounding the display control device 10 such as luminous intensity and noise around the display control device 10. The sensor 935 may include a global positioning system (GPS) sensor that receives GPS signals to measure latitude, longitude, and altitude of the device. Further, the detecting unit 120 can be realized by the sensor 935.

2. CONCLUSION

As described above, according to the embodiment of the present disclosure, a display control device including a display control unit configured to control display of information related to one target object located in a field of view of a user, wherein, in a case in which it is determined that at least a part of one target object is shielded by another object on the basis of a position of the user, the display control unit controls display of an image related to one target object. Accordingly, it is possible for the user to easily comprehend one target object whose AR information is presented to the user.

The preferred embodiment (s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the position of each component is not particularly limited as long as the operations of the display control device 10 and the server 20 are realized. As a specific example, some or all of the blocks (the display control unit 111, the selecting unit 112, and the determining unit 113) included in the control unit 110 in the display control device 10 may be installed in the server 20 or the like. Further, in addition to the display control device 10 and the server 20, for example, one or more relay devices (not illustrated) that perform the processes of some of the respective units may be installed in the display control system 1. In this case, the relay device may be, for example, a smartphone carried by the user U-1. For example, the relay device includes a communication circuit for communicating with the display control device 10 and the server 20 and a processing circuit for performing some of the processes performed by the respective blocks in the embodiment in the housing of the relay device. Further, when the relay device receives predetermined data from, for example, the communication unit 230 of the server 20, performs the processes of some of the respective units, and transmits data to the communication unit 130 of the display control device 10 on the basis of a processing result or performs communication and processes in an opposite direction, effects similar to those of the embodiment of the operations of the display control device 10 and the server 20 are obtained.

Further, the example of connecting the target object (for example, the farm animal) with the individual information of the target object located in the real world in the field of view of the user (the example of performing the AR display of the individual information of the target object) has been described above. However, the connection of the target object located in the real world and the individual information of the target object (the AR display of the individual information of the target object) may not be performed. If a case in which the target object is a farm animal is described as an example, in a case in which the user can visually recognize an identification number of a farm animal from a sensor worn on the farm animal, a correspondence between the target object and the individual information can be comprehended using a position at which the identification number is visually recognized. According to such a configuration, a processing load imposed by the display control device 10 can be reduced.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A display control device, including:

a display control unit configured to control display of information related to a target object located in a field of view of a user, in which, in a case in which it is determined that at least a part of the target object is shielded by another object on the basis of a position of the user, the display control unit controls display of an image related to the target object such that the target object shielded in the field of view is displayed in a form different from a form visually recognized by the user.

(2)

The display control device according to (1), in which the display control unit performs control such that augmented reality (AR) in which information related to the target object is associated with the target object is displayed in a case in which it is determined that the at least a part of the target object is not shielded by the other object, and performs control such that virtual reality (VR) display for causing the shielded target object to be selected is performed in a case in which it is determined that the at least a part of the target object is shielded by the other object.

(3)

The display control device according to (2), in which the AR display is display for causing the user to recognize that the information related to the target object is displayed in a space visually recognized by the user, and the VR display is at least one of an overhead image corresponding to the target object, a three-dimensional image corresponding to the target object, or a captured image including an image in which the target object is not shielded.

(4)

The display control device according to (2) or (3), in which the display control unit controls display of the information related to the target object in a case in which the user selects the target object using the VR display.

(5)

The display control device according to any one of (2) to (4), further including:

a housing worn on a head of the user;

a display installed in the housing and configured to perform the AR display and the VR display; and a determining unit configured to determine whether or not the at least a part of the target object is shielded by the other object on the basis of the position of the user, in which the determining unit performs determination on the basis of whether or not a condition other than presence or absence of a touch manipulation and a button manipulation by the user is satisfied.

(6)

The display control device according to any one of (1) to (5), in which the target object is a farm animal.

(7)
The display control device according to any one of (1) to (6), in which the display control unit controls display of an image related to the target object in a case in which a distance between the user and the target object exceeds a predetermined distance.

(8)
The display control device according to any one of (1) to (7), in which the display control unit controls display of an image related to the target object in a case in which a predetermined display manipulation by the user is performed.

(9)
The display control device according to any one of (1) to (8), in which the display control unit controls display of an image related to the target object in a case in which the target object takes a predetermined posture or in a case in which the target object is performing a predetermined motion.

(10)
The display control device according to any one of (1) to (9), in which the display control unit controls display of link information connecting a position of the target object in the field of view with a position of information related to the target object.

(11)
The display control device according to any one of (1) to (10), in which, the display control unit decides a position of the information related to the target object on the basis of a position of the target object in the field of view in a case in which the target object is not moving and fixes the position of the information related to the target object in a case in which the target object is moving.

(12)
The display control device according to any one of (1) to (11), in which, in a case in which there is a plurality of target objects including the target object in the field of view, the display control unit controls display of information related to each of the plurality of target objects.

(13)
The display control device according to (12), in which, in a case in which a density of each piece of information related to each of the plurality of target objects is higher than a predetermined density, the display control unit controls display of each image related to the plurality of target objects.

(14)
The display control device according to (12) or (13), in which, in a case in which a density of each piece of information related to each of the plurality of target objects is higher than a predetermined density, the display control unit stops display of each piece of information related to the plurality of target objects.

(15)
The display control device according to any one of (12) to (14), in which, in a case in which a density of each piece of information related to each of the plurality of target objects is higher than a predetermined density, the display control unit controls at least one of display or non-display of each piece of information related to the plurality of target objects, a display position, or an information amount.

(16)
The display control device according to any one of (1) to (15), in which the display control unit causes identification information of the target object to be displayed superimposed on the target object in the field of view.

(17)
The display control device according to (5), in which the determining unit determines that the part of the target object is shielded by the other object in a case in which a partial region of the target object is shown in a captured image of the field of view, and a region of the other object is shown near the partial region.

(18)
The display control device according to (5), in which the determining unit determines that the at least a part of the target object is shielded by the other object in a case in which directions of the target object and the other object coincide or are close to each other on the basis of the position of the user, and the target object is farther than the other object on the basis of the position of the user.

(19)
A display control method, including:
controlling display of information related to a target object located in a field of view of a user; and
controlling, by a processor, in a case in which it is determined that at least a part of the target object is shielded by another object on the basis of a position of the user, display of an image related to the target object such that the target object shielded in the field of view is displayed in a form different from a form visually recognized by the user.

(20)
A program causing a computer to function as a display control device including:
a display control unit configured to control display of information related to a target object located in a field of view of a user; and
in which, in a case in which it is determined that at least a part of the target object is shielded by another object on the basis of a position of the user, the display control unit controls display of an image related to the target object such that the target object shielded in the field of view is displayed in a form different from a form visually recognized by the user.

REFERENCE SIGNS LIST 1 display control system
10 display control device
110 control unit
111 display control unit
112 selecting unit
113 determining unit
120 detecting unit
130 communication unit
150 storage unit
160 output unit
20 server
210 control unit
211 information acquiring unit
212 information providing unit
220 storage unit
221 farm animal information
230 communication unit
30 external sensor
40 wearable device
50 repeater
60 gateway device

The invention claimed is:
1. A display control device, comprising:
a display control unit configured to control display of information related to a target object located in a field of view of a user, wherein, in a case in which it is determined that at least a part of the target object is shielded by another object on a basis of a position of the user, the display control unit controls display of an image related to the target object such that the target object shielded in the field of view is displayed in a form different from a form visually recognized by the user, wherein the display control unit:
performs control such that augmented reality (AR) in which information related to the target object is associated with the target object is displayed in a case in which it is determined that the at least a part of the target object is not shielded by the other object, and performs control such that virtual reality (VR) display for causing the shielded target object to be selected is performed in a case in which it is determined that the at least a part of the target object is shielded by the other object.

2. The display control device according to claim 1, wherein the AR display is display for causing the user to recognize that the information related to the target object is displayed in a space visually recognized by the user, and the VR display is at least one of an overhead image corresponding to the target object, a three-dimensional image corresponding to the target object, or a captured image including an image in which the target object is not shielded.

3. The display control device according to claim 1, wherein the display control unit controls display of the information related to the target object in a case in which the user selects the target object using the VR display.

4. The display control device according to claim 1, further comprising:
a housing worn on a head of the user;
a display installed in the housing and configured to perform the AR display and the VR display; and
a determining unit configured to determine whether or not the at least a part of the target object is shielded by the other object on the basis of the position of the user,
wherein the determining unit performs determination on the basis of whether or not a condition other than presence or absence of a touch manipulation and a button manipulation by the user is satisfied.

5. The display control device according to claim 1, wherein the target object is a farm animal.

6. The display control device according to claim 1, wherein the display control unit controls display of an image related to the target object in a case in which a distance between the user and the target object exceeds a predetermined distance.

7. The display control device according to claim 1, wherein the display control unit controls display of an image related to the target object in a case in which a predetermined display manipulation by the user is performed.

8. The display control device according to claim 1, wherein the display control unit controls display of an image related to the target object in a case in which the target object takes a predetermined posture or in a case in which the target object is performing a predetermined motion.

9. The display control device according to claim 1, wherein the display control unit controls display of link information connecting a position of the target object in the field of view with a position of information related to the target object.

10. The display control device according to claim 1, wherein, the display control unit decides a position of the information related to the target object on a basis of a position of the target object in the field of view in a case in which the target object is not moving and fixes the position of the information related to the target object in a case in which the target object is moving.

11. The display control device according to claim 1, wherein, in a case in which there is a plurality of target objects including the target object in the field of view, the display control unit controls display of information related to each of the plurality of target objects.

12. The display control device according to claim 11, wherein, in a case in which a density of each piece of information related to each of the plurality of target objects is higher than a predetermined density, the display control unit controls display of each image related to the plurality of target objects.

13. The display control device according to claim 11, wherein, in a case in which a density of each piece of information related to each of the plurality of target objects is higher than a predetermined density, the display control unit reduces the displayed number of information related to the plurality of target objects.

14. The display control device according to claim 11, wherein, in a case in which a density of each piece of information related to each of the plurality of target objects is higher than a predetermined density, the display control unit controls at least one of display or non-display of each piece of information related to the plurality of target objects, a display position, or an information amount.

15. The display control device according to claim 1, wherein the display control unit causes identification information of the target object to be displayed superimposed on the target object in the field of view.

16. The display control device according to claim 4, wherein the determining unit determines that the part of the target object is shielded by the other object in a case in which a partial region of the target object is shown in a captured image of the field of view, and a region of the other object is shown near the partial region.

17. The display control device according to claim 4, wherein the determining unit determines that the at least a part of the target object is shielded by the other object in a case in which directions of the target object and the other object coincide or are close to each other on the basis of the position of the user, and the target object is farther than the other object on the basis of the position of the user.

18. A display control method, comprising:
controlling display of information related to a target object located in a field of view of a user;
controlling, by a processor, in a case in which it is determined that at least a part of the target object is shielded by another object on a basis of a position of the user, display of an image related to the target object such that the target object shielded in the field of view is displayed in a form different from a form visually recognized by the user;
controlling display such that augmented reality (AR) in which information related to the target object is associated with the target object is displayed in a case in which it is determined that the at least a part of the target object is not shielded by the other object; and
controlling display such that virtual reality (VR) display for causing the shielded target object to be selected is performed in a case in which it is determined that the at least a part of the target object is shielded by the other object.

19. At least one non-transitory computer-readable storage medium storing processor-executable instructions that, when executed by at least one processor, cause the at least one processor to function as a display control device comprising:
   a display control unit configured to control display of information related to a target object located in a field of view of a user,
   wherein, in a case in which it is determined that at least a part of the target object is shielded by another object on a basis of a position of the user, the display control unit controls display of an image related to the target object such that the target object shielded in the field of view is displayed in a form different from a form visually recognized by the user,
   wherein the display control unit:
      performs control such that augmented reality (AR) in which information related to the target object is associated with the target object is displayed in a case in which it is determined that the at least a part of the target object is not shielded by the other object, and
      performs control such that virtual reality (VR) display for causing the shielded target object to be selected is performed in a case in which it is determined that the at least a part of the target object is shielded by the other object.

* * * * *